(12) United States Patent
Meltzer et al.

(10) Patent No.: US 6,375,770 B1
(45) Date of Patent: *Apr. 23, 2002

(54) APPARATUS AND METHOD FOR FORMING AN ADHESIVELY BONDED SEAM BETWEEN RESILIENTLY COMPRESSIBLE FABRIC SHEETS

(75) Inventors: Mark J. Meltzer, San Francisco; Tommas J. Tompkins, Berkeley, both of CA (US)

(73) Assignee: O'Neill, Inc., Santa Cruz, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/909,367

(22) Filed: Aug. 11, 1997

Related U.S. Application Data

(63) Continuation-in-part of application No. 08/285,240, filed on Aug. 3, 1994, now Pat. No. 5,693,177, which is a continuation of application No. 08/002,082, filed on Jan. 8, 1993, now Pat. No. 5,336,346, which is a continuation of application No. 07/557,670, filed on Jul. 24, 1990, now abandoned.

(51) Int. Cl.[7] .............................................. B29C 65/08

(52) U.S. Cl. .................. 156/73.4; 156/73.6; 156/304.1; 156/304.6; 156/502; 156/507; 156/580.1

(58) Field of Search ................................. 156/502, 507, 156/580.1, 580.2, 73.1, 73.4, 304.1, 304.6, 356, 361

(56) References Cited

U.S. PATENT DOCUMENTS

2,626,430 A    1/1953  Dawson (List continued on next page.)

FOREIGN PATENT DOCUMENTS

DE           0078645           12/1970

(List continued on next page.)

OTHER PUBLICATIONS

Ultrasonic Welding of Plastics, Welding Production Sep.–Dec. 1959, pp. 85–92.*

(List continued on next page.)

*Primary Examiner*—Steven D. Maki
(74) *Attorney, Agent, or Firm*—Flehr Hohbach Test Albritton & Herbert

(57) ABSTRACT

An apparatus (21, 221, 231) for forming a butt seam (33, 233, 354) between opposed edges (32, 33, 231, 232) of resiliently compressible, fully cured, elastomeric, fabric sheets (28, 29, 228, 229, 351, 352), such as foamed neoprene for wet suits and dry suits. In some embodiments (21, 221) the apparatus includes fabric manipulating assembly (23, 223) which continuously compresses the sheets proximate and inwardly of the edges, preferably by a roller assembly (26, 27, 226, 227), to firmly press the opposed edges of the flexible and compressible sheets (28, 29, 228, 229) tightly together during movement and bonding along the seam (33, 233). The apparatus (21, 221, 331) preferably includes adhesive activation device in the form of an ultrasonic transducer (24, 222, 322) which contacts the neoprene pieces to activate a dry neoprene cement carried on the edges of the fabric pieces. Embodiments (221, 321) are shown which include a force applying assembly (224, 324) that hammers the foam pieces against the ultrasonic transducer horn (222), or the horn (322) against the foam pieces, to enhance sonic energy coupling and to simultaneously press the pieces together for improved adhesive bonding. A method for forming the butt seam (33, 233, 354) is described.

20 Claims, 11 Drawing Sheets

U.S. PATENT DOCUMENTS

| | | |
|---|---|---|
| 2,941,577 A | 6/1960 | Roseman |
| 2,995,181 A | 8/1961 | Borys |
| 3,171,415 A | 3/1965 | Williamson et al. |
| 3,284,257 A | 11/1966 | Soloff et al. |
| 3,294,617 A | 12/1966 | Way |
| 3,400,030 A | 9/1968 | Burgee |
| 3,445,307 A * | 5/1969 | Balamuth et al. ........ 156/580.1 |
| 3,480,492 A | 11/1969 | Hauser |
| 3,586,567 A | 6/1971 | Ryan |
| 3,615,994 A | 10/1971 | MacLaine et al. |
| 3,616,123 A | 10/1971 | Reynolds |
| 3,652,354 A | 3/1972 | Su |
| 3,660,186 A | 5/1972 | Sager et al. |
| 3,841,947 A * | 10/1974 | Bocquet et al. .......... 156/580.1 |
| 3,904,457 A | 9/1975 | Laughlin |
| 3,909,341 A | 9/1975 | Moscovita |
| 4,048,004 A * | 9/1977 | Watkins ................... 156/580.1 |
| 4,173,509 A | 11/1979 | Raabe et al. |
| 4,231,836 A | 11/1980 | Ljunggvist et al. |
| 4,404,052 A | 9/1983 | Persson et al. |
| 4,416,027 A | 11/1983 | Perla |
| 4,675,016 A | 6/1987 | Meul et al. |
| 4,747,894 A | 5/1988 | Johnston et al. |
| RE33,063 E * | 9/1989 | Obeda ..................... 156/580.1 |
| 4,867,823 A | 9/1989 | Pizzorno |
| 5,693,177 A * | 12/1997 | Meltzer et al. ............. 156/502 |

FOREIGN PATENT DOCUMENTS

| | | | |
|---|---|---|---|
| GB | 1451831 | | 2/1974 |
| JP | 11220 | | 2/1981 |
| JP | 53040 | | 5/1981 |
| JP | 219629 | | 9/1986 |
| SU | 545481 | | 3/1977 |
| WO | WO92/01396 | * | 2/1992 |

OTHER PUBLICATIONS

Branson Data Sheet PW–15, Nov. 1981.*

Landrock, *Adhesives Technology Handbook*, pp. 205–224, 1985.*

The Vanderbilt Rubber Handbook (1958) p. 200.

Adhesives Handbook, CRC Press (1970) pp. 258–260.

Research Disclosure (Oct. 1976) pp. 44–46.

* cited by examiner

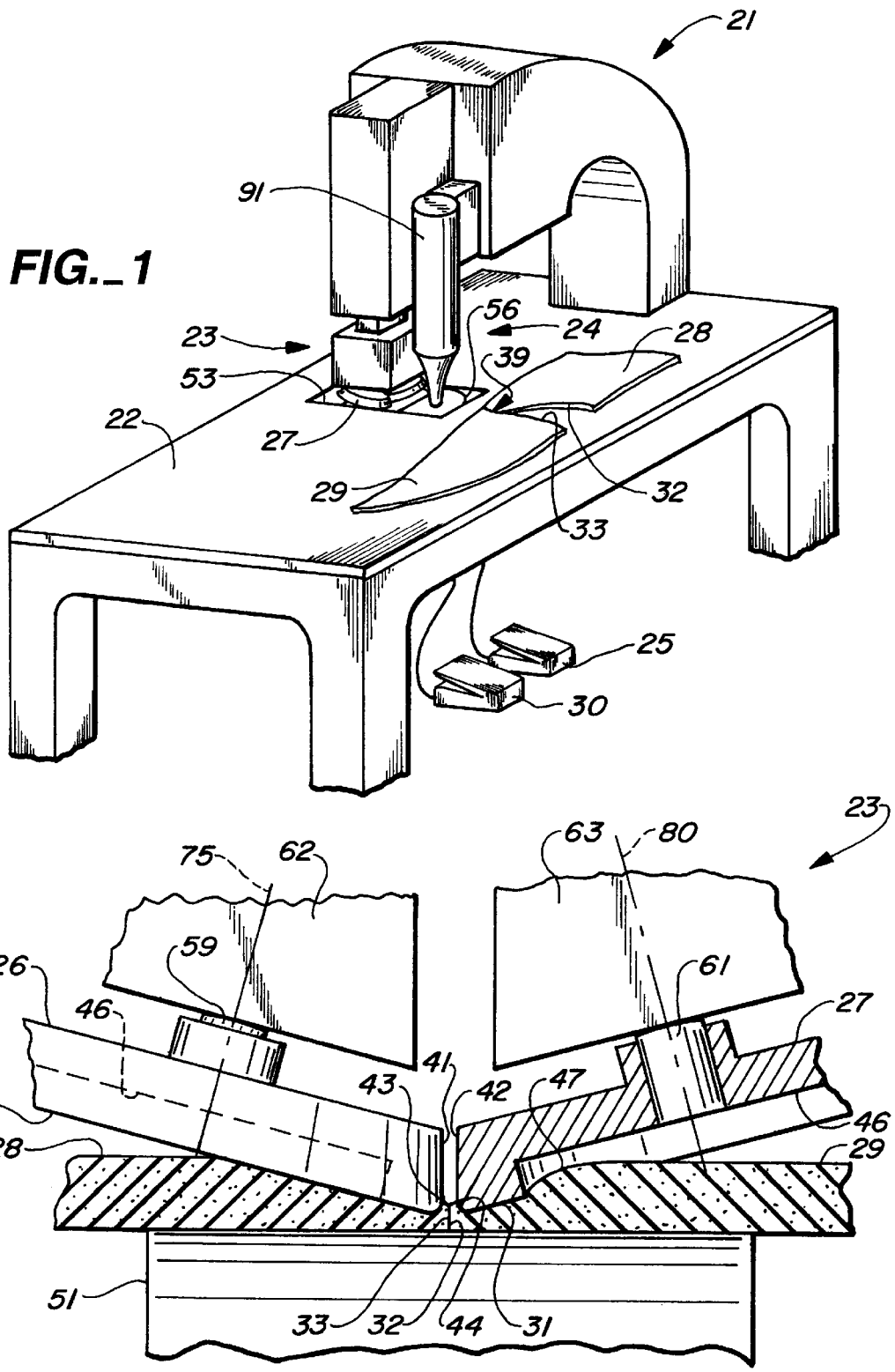
*FIG._1*
*FIG._4*

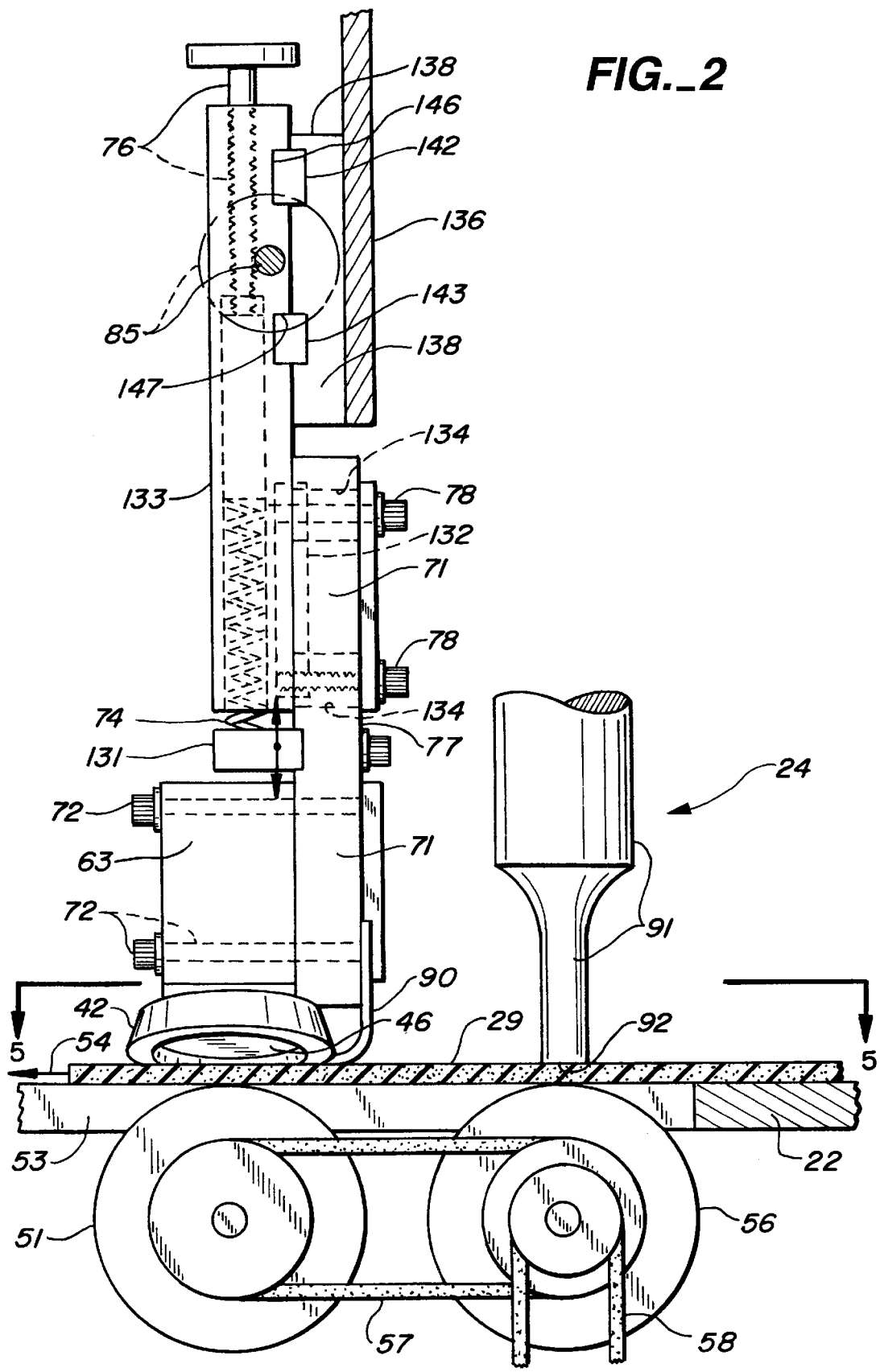
FIG._2

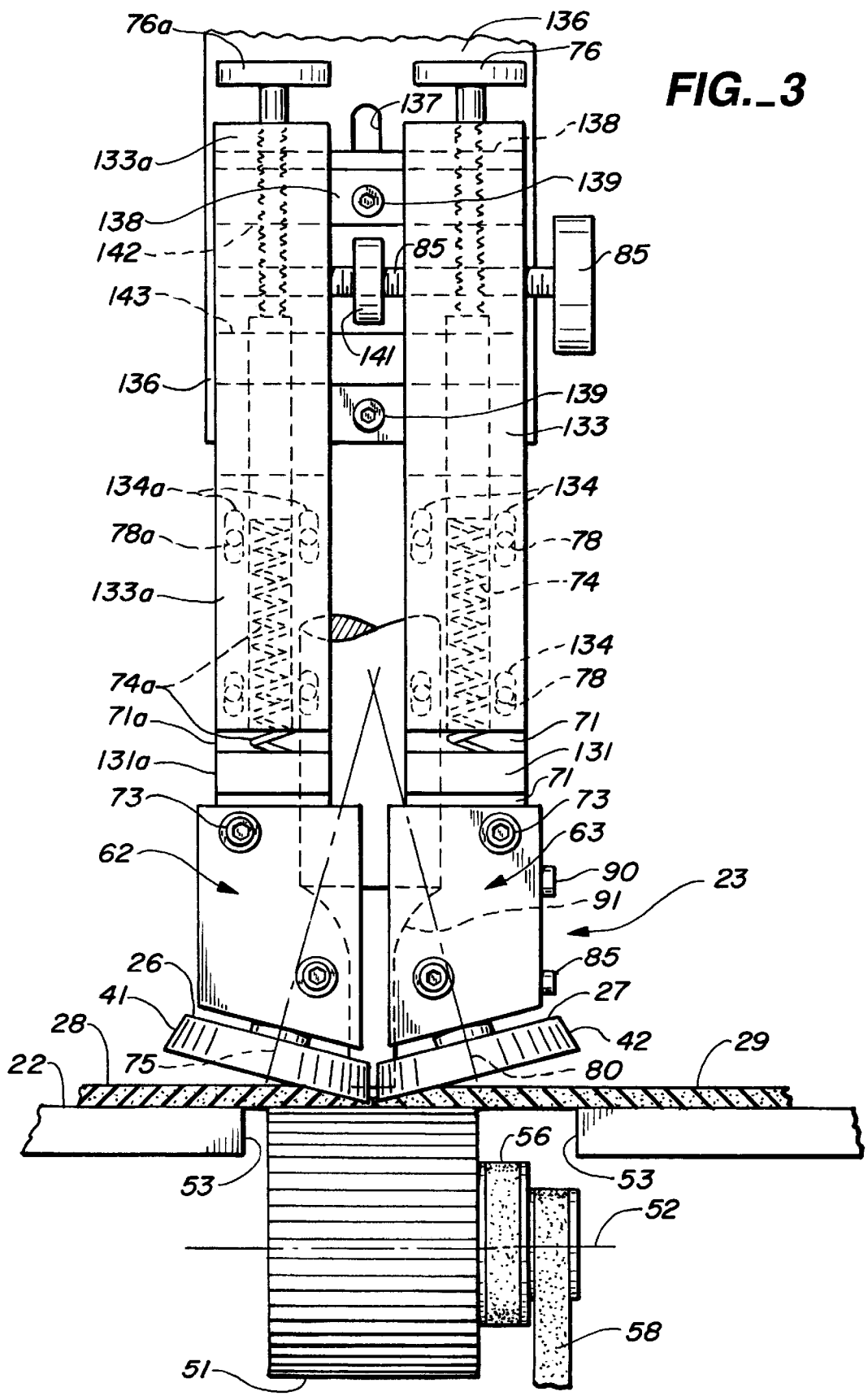
FIG._3

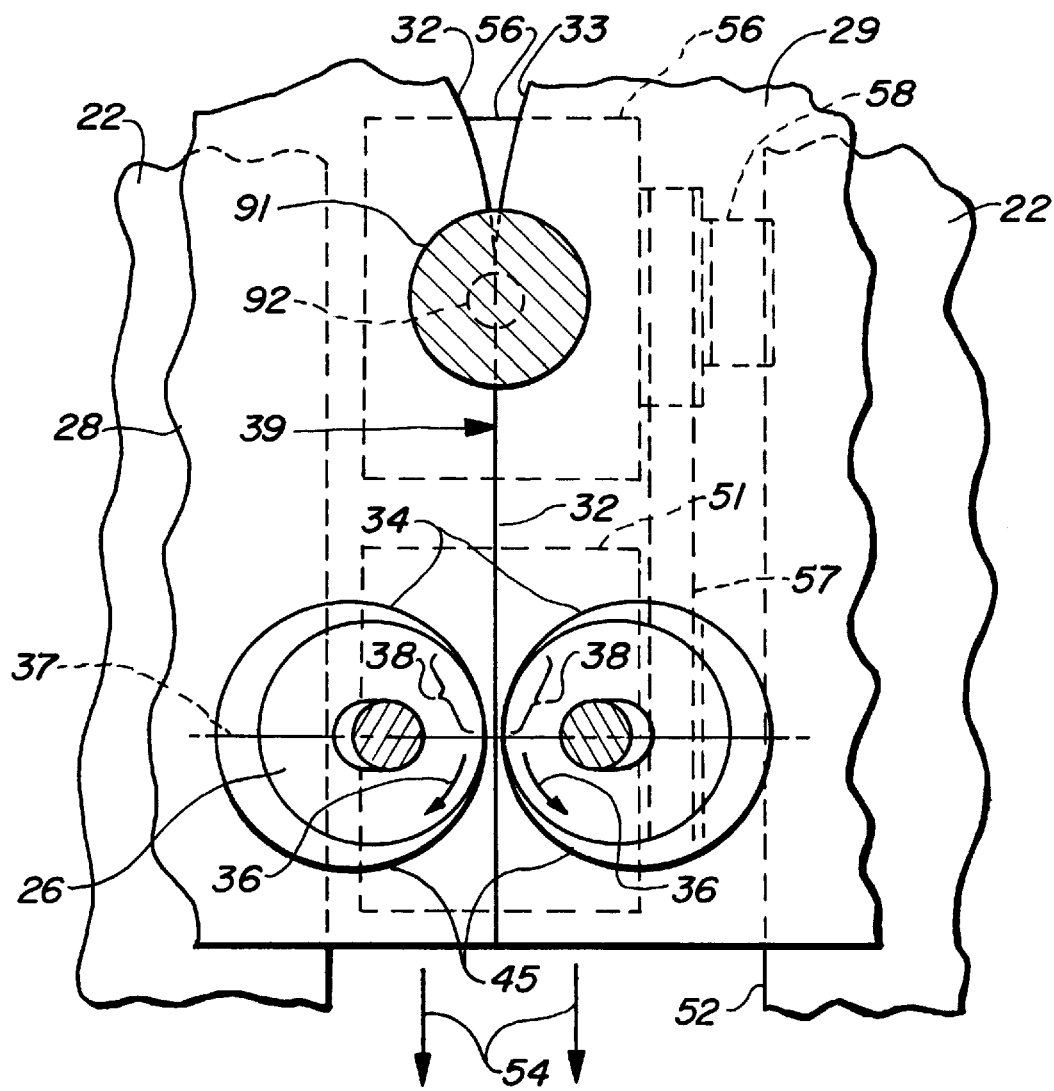
FIG._5

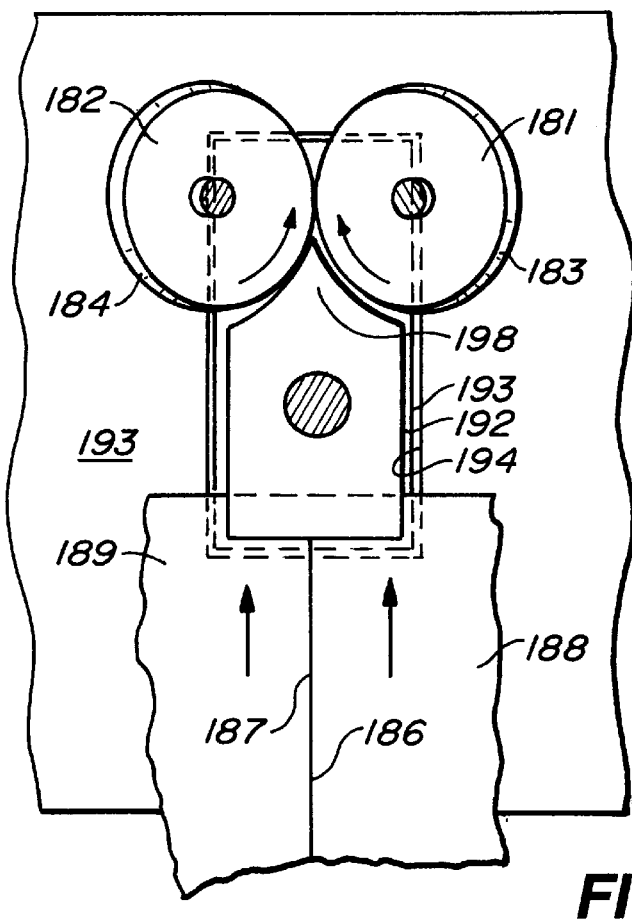
FIG._6
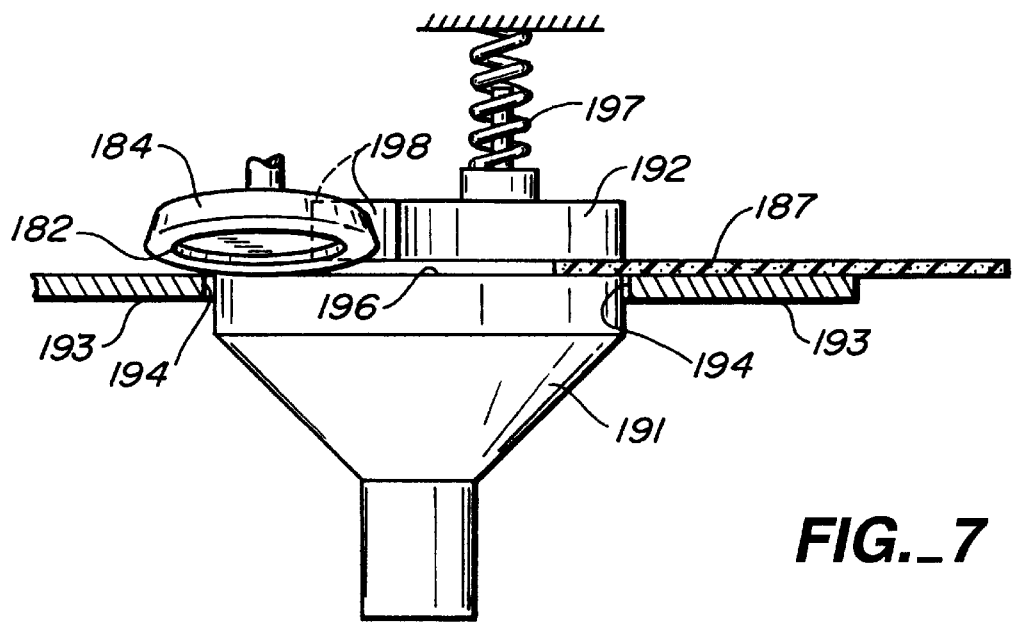
FIG._7

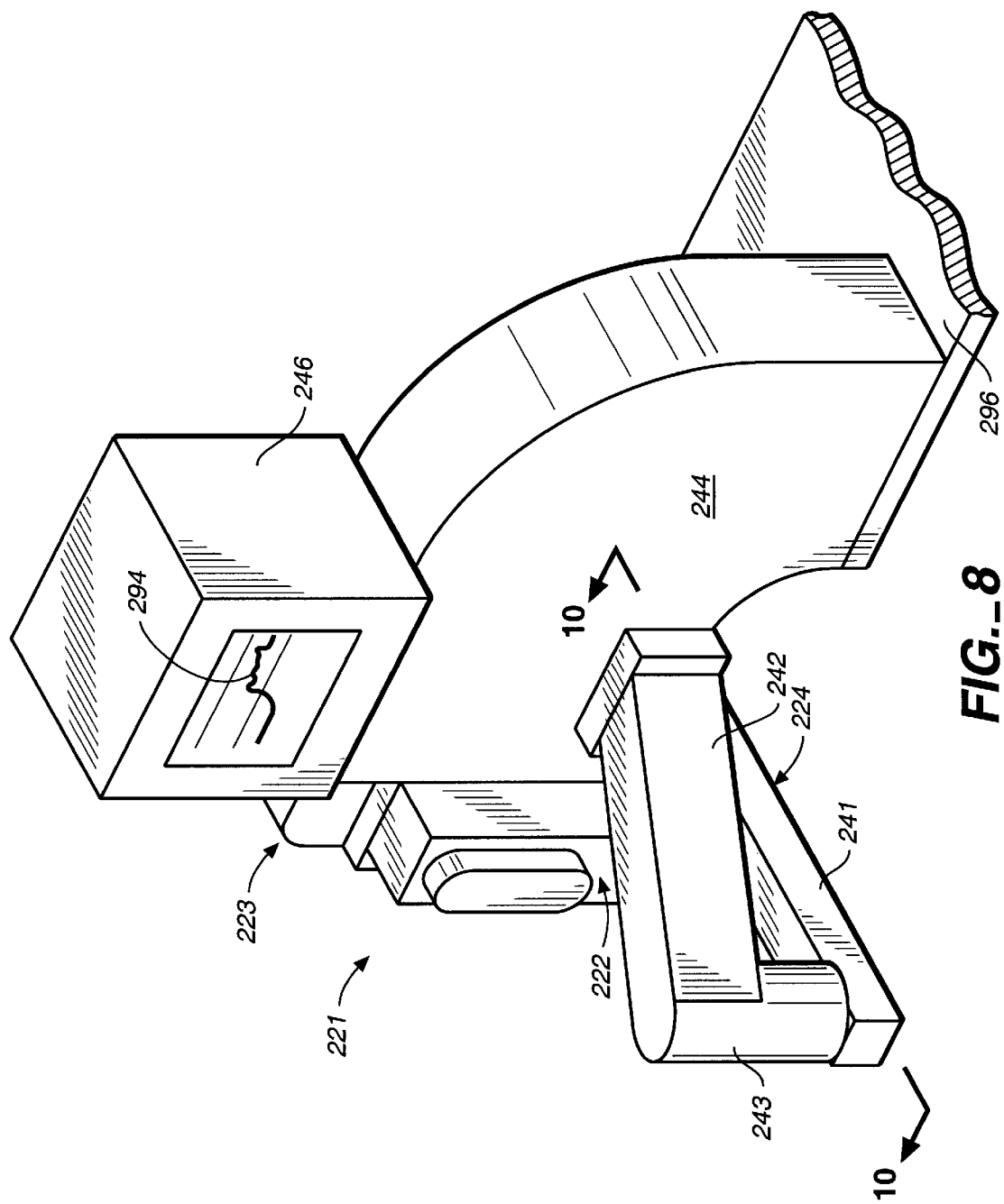
FIG._8

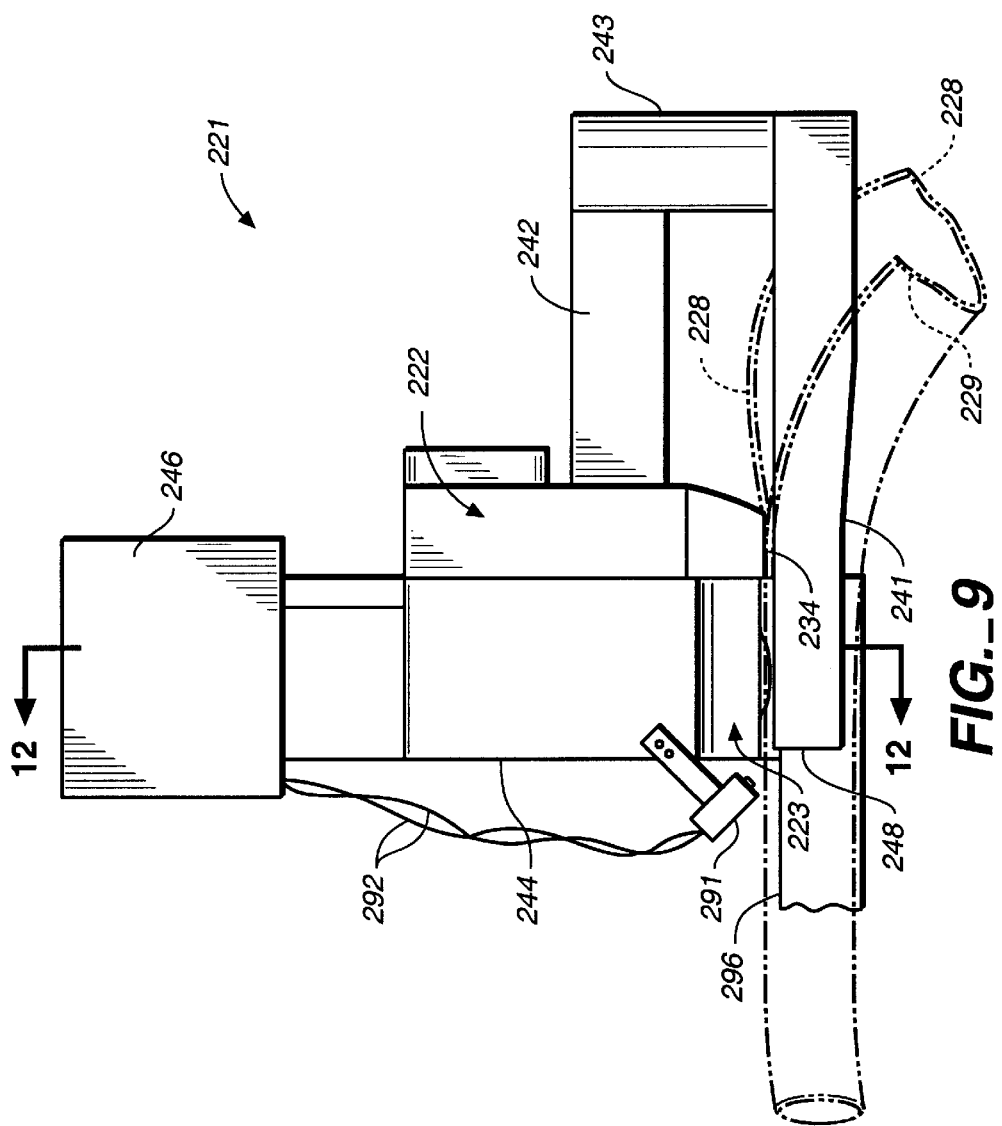
FIG._9

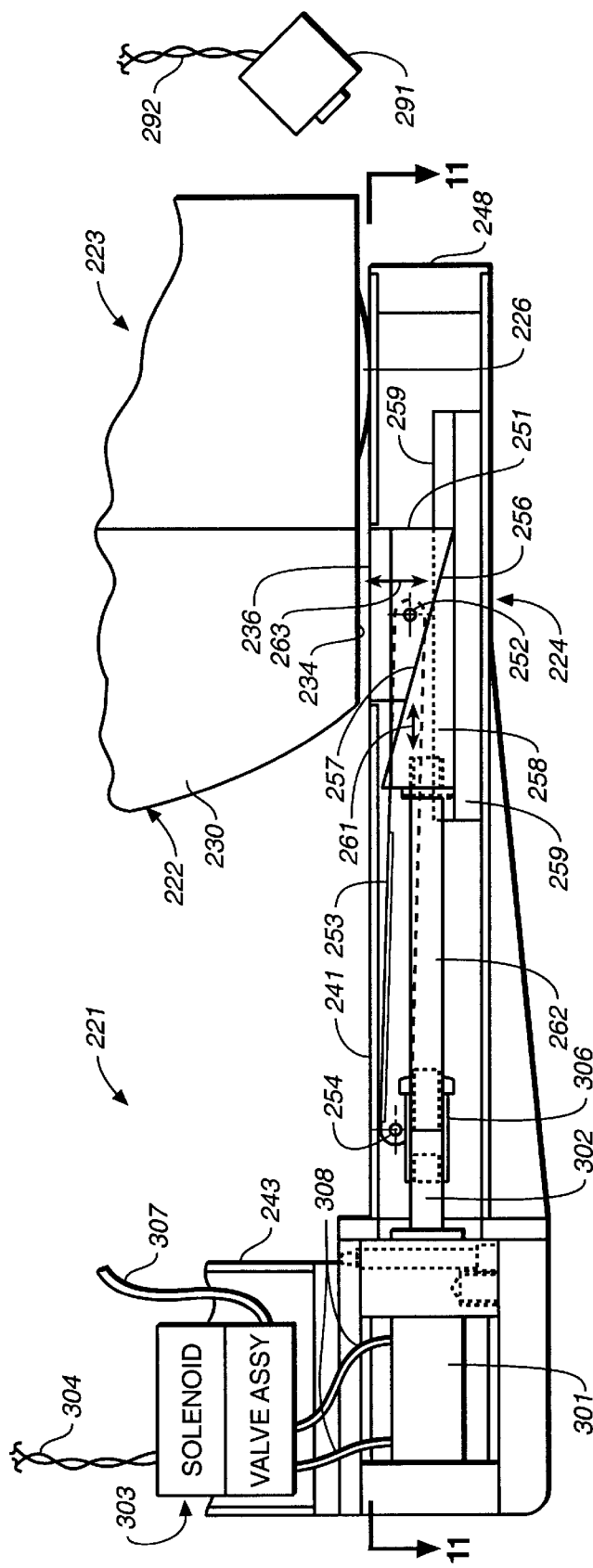
FIG._10

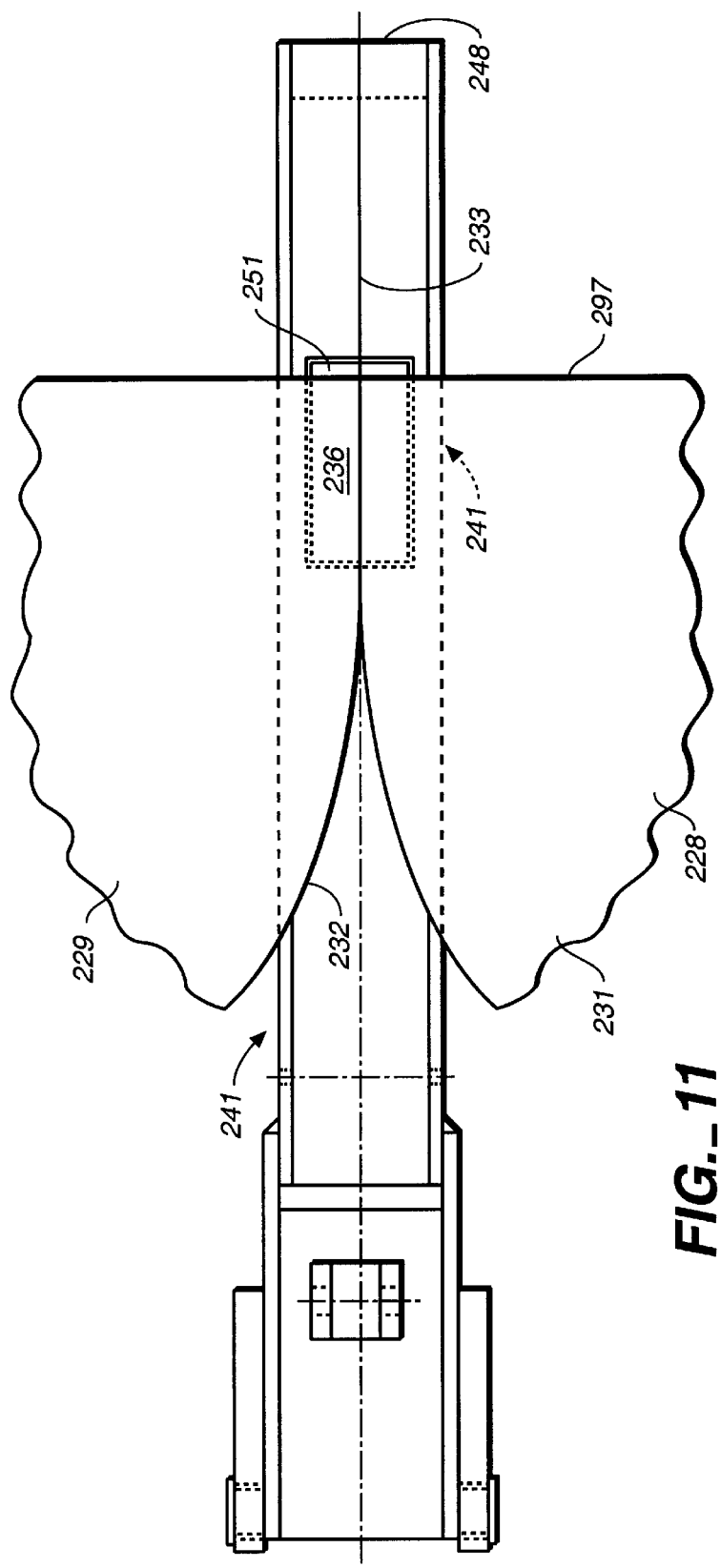
FIG._11

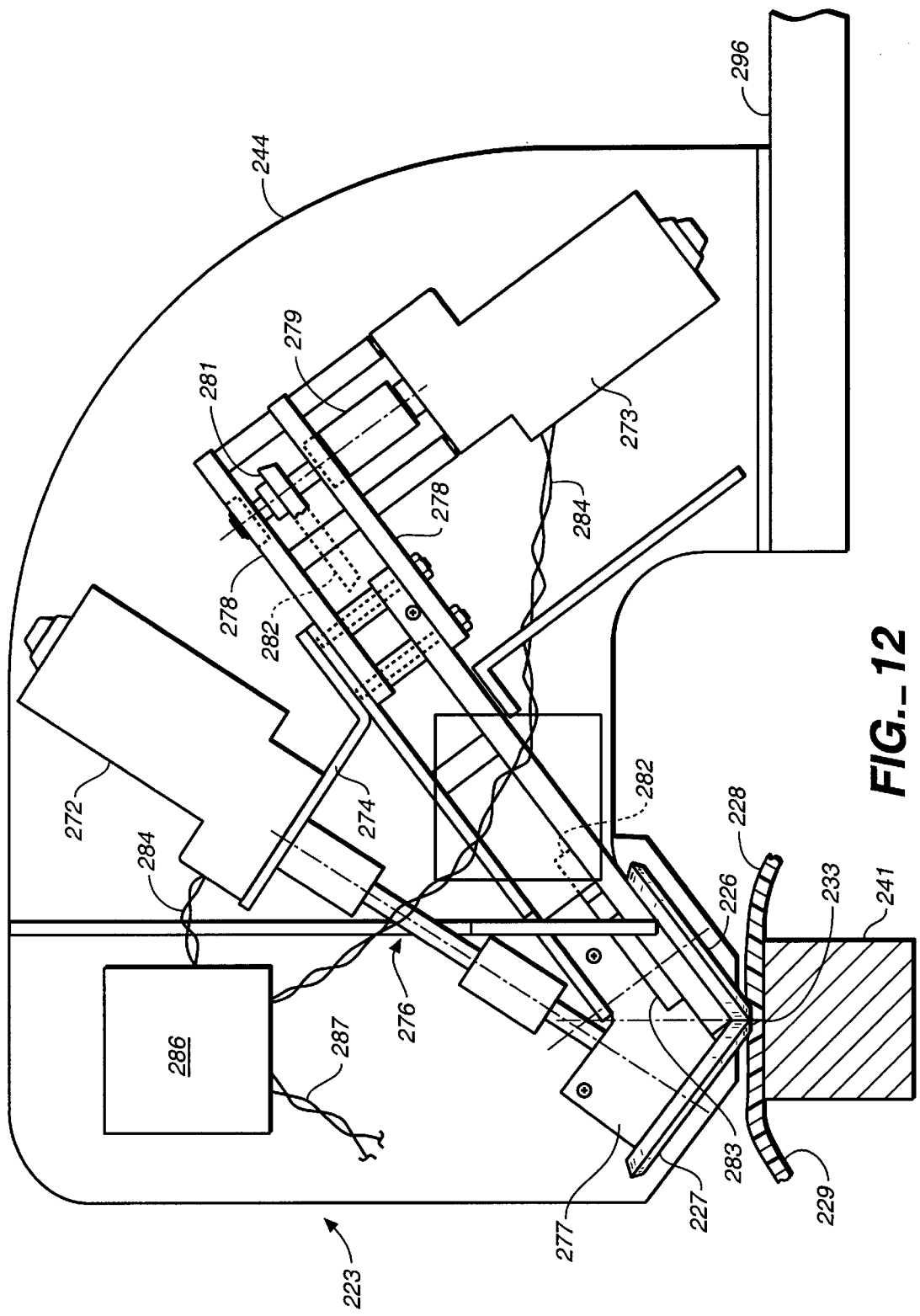
FIG._12

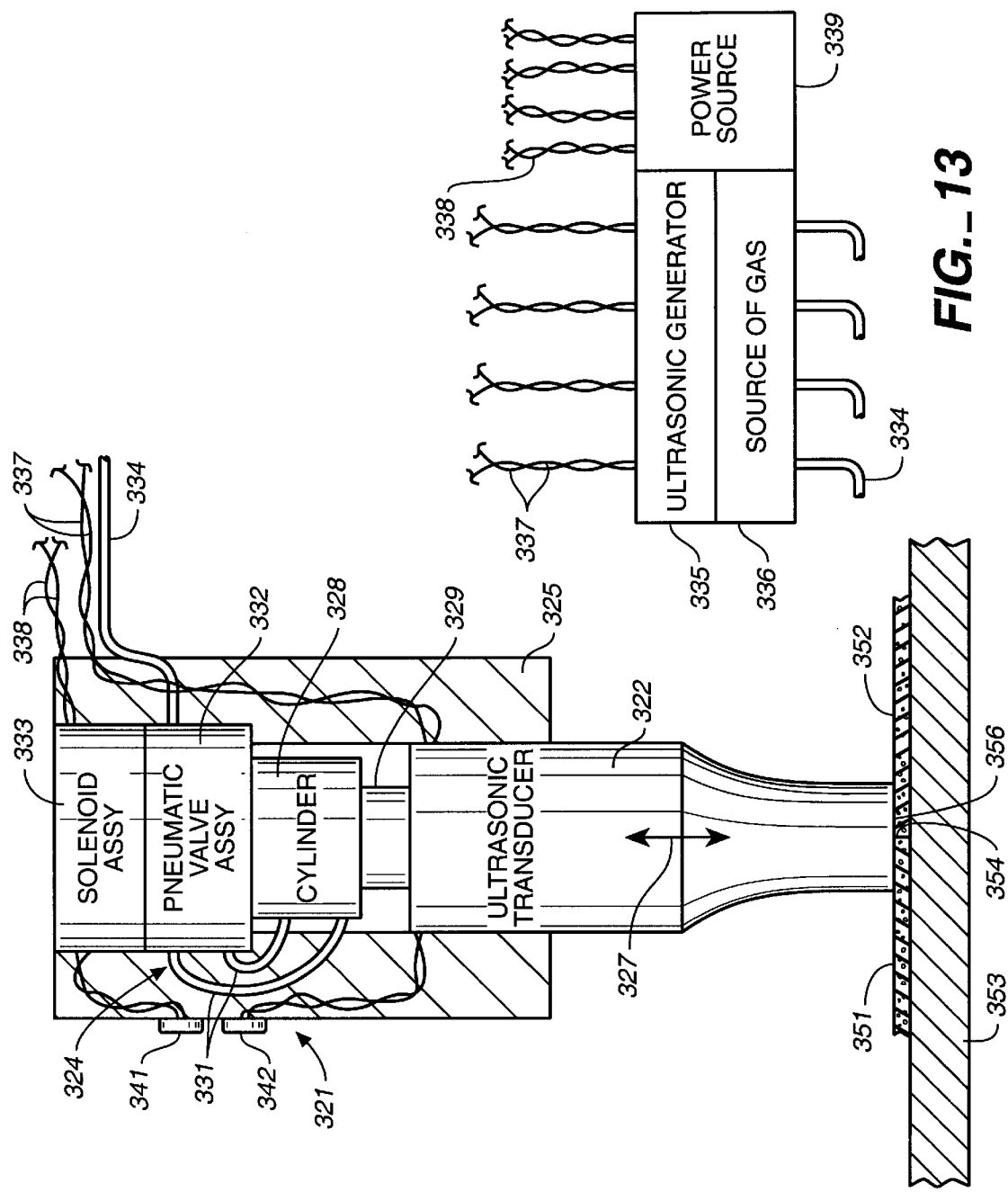
FIG._13

APPARATUS AND METHOD FOR FORMING AN ADHESIVELY BONDED SEAM BETWEEN RESILIENTLY COMPRESSIBLE FABRIC SHEETS

RELATED APPLICATIONS

This application is a continuation-in-part of application Ser. No. 08/285,240, filed Aug. 3, 1994 for APPARATUS AND METHOD FOR FORMING AN ADHESIVELY BONDED SEAM BETWEEN RESILIENTLY COMPRESSIBLE FABRIC SHEETS, now U.S. Pat. No. 5,693,177 which application was a continuation application of application Ser. No. 08/002,082, filed Jan. 8, 1993, for METHOD FOR FORMING AN ADHESIVELY BONDED SEAM BETWEEN RESILIENTLY COMPRESSIBLE FABRIC SHEETS, now U.S. Pat. No. 5,336,346, which application was a continuation application of application Ser. No. 07/557,670, filed Jul. 24, 1990 for APPARATUS AND METHOD FOR FORMING AN ADHESIVELY BONDED SEAM BETWEEN RESILIENTLY COMPRESSIBLE FABRIC SHEETS, now abandoned.

TECHNICAL FIELD

The present invention relates, in general, to the formation of seams between two opposed edges of fabric sheets, and more particularly, relates to apparatus and methods for the formation of adhesively bonded butt seams between foamed, fully cured, elastomeric, resiliently compressible and flexible sheets of material of the type used in wet suits, dry suits and the like.

BACKGROUND OF THE INVENTION

Wet suits and dry suits of the type used in aquatic sports, such as wind surfing, board surfing, water skiing and scuba diving typically are fabricated from pieces of fully cured or set (no longer thermoplastic), foamed, neoprene rubber. The suits are comprised of various fabric pieces which are cut into shapes that accommodate the user's anatomy, provide desired elongation, and produce a variety of aesthetic effects. The wet suit pieces are joined together in seams which are either stitched or adhesively bonded, or a combination of both.

When a wet suit is fabricated using a seam stitching technique, the cost of manufacturing the wet suit is reasonable since conventional fabric seaming equipment, such as overlock sewing machines, can be employed. Thus, wet suits having stitched seams are good candidates for production sewing and semi-automated fabrication.

Unfortunately, wet suits having overlock-type stitched seams inherently leak water at the seams, which is tolerable for a wet suit, in that it is contemplated that water will enter the wet suit. Water leakage, however, is unacceptable for dry suits and should be minimized for wet suits which are intended for use in relatively cool or cold water locations.

Accordingly, dry suits and wet suits which are designed for use in cold water are formed from pieces of neoprene rubber material which are adhesively bonded together in butt seams so as not to leak water at the seams. Sometimes these suits are also blind stitched to reinforce the seam, but using current adhesive bonding techniques, the glued seams typically have a strength which is at least as great as the foamed neoprene rubber itself.

Adhesively bonding or gluing together of two foamed, fully cured or vulcanized, neoprene sheets, however, is a very labor intensive process. Conventional garment-industry fabrication techniques cannot be used because the resiliently compressible neoprene pieces are very difficult to manipulate, and the vulcanized or cured neoprene requires the application and/or activation of an adhesive bonding material on the edges of the pieces to be joined together.

Wet suits and dry suits are formed from fully cured neoprene sheets which have a thickness in the range of about 1 to about 6 millimeters, and the foamed neoprene fabric is both resiliently stretchy and flexible. In some instances, pieces of different thicknesses are bonded together, and often the neoprene will have a nylon fabric facing bonded to one or both sides of the sheet.

Currently, neoprene adhesive bonding is accomplished by applying a neoprene adhesive to the edges of the sheets to be bonded together. Usually the adhesive is applied to a plurality of similarly shaped pieces that are stacked with their edges exposed so that the adhesive can be applied with a brush to the edges only. The adhesive is then allowed to dry. After the adhesive has dried, a solvent is used to reactivate the adhesive when two pieces are to be seamed together. The pieces to be joined have their adhesive-coated edges painted with solvent, and then the edges are pressed together by hand. Finally, a pair of pneumatic pliers must be used to positively press or squeeze the edges of the pieces together to uniform bonding. The pliers are pushed down into the neoprene foam adjacent and inwardly of the edges and the jaws are closed to press the abutting edges of adjacent pieces together. This is repeated along the length of the seam by using a series of side-by-side, longitudinally adjacent pinching, releasing and moving steps.

While this technique produces a strong seam, the application of solvent using a brush, pressing together of the fabric pieces by hand and pneumatic squeezing with pliers of the pieces to bonding, all are labor intensive and undesirably costly. Moreover, the pneumatic pliers clamp the pieces together in a manner which appears to result in residual stresses in the seam. Additionally, there are significant health and safety hazards to the wet suit fabricator in connection with the application of solvent and the repeated, rapid use of pneumatic pliers.

An example of a stitched and bonded seam construction suitable for use in wet suits or the like is shown in U.S. Pat. No. 4,416,027 to Perla. This seam also includes a reinforcing insert, but as will be apparent, the hand labor required to create such a seam, and therefore the cost of forming the same, is substantial.

Adhesively bonded butt seams have been formed between sheets of plastic and rubber for various other applications. In U.S. Pat. No. 3,615,994 to MacLaine, laminated sheets, which include foamed layers, are joined together in a butt seam. In the process and apparatus of the MacLaine patent, however, the two edges which are joined at the seam are not urged toward each other, but instead are merely held in registration and overlapped on the front and back sides by a reinforcing tape.

In U.S. Pat. No. 4,231,836 to Ljungqvist, et al. and U.S. Pat. No. 4,867,823 to Pizzorno apparatus and processes for joining together unvulcanized rubber strips of material of the type used in automobile tires are disclosed. In both patents, cord strips, which are comprised of fiber or metallic cords that are oriented in a predetermined direction and surrounded by unvulcanized rubber, are joined in edge-to-edge abutting relationship. The apparatus in both patents includes bevelled wheel or roller assemblies which progressively urge the two opposed cord strip pieces toward each other during formation of the seam. The cord strips are held together initially by reason of the inherent stickiness of the unvulcanized rubber, and a separate vulcanization process is required to permanently bond the sheets together.

In both Ljungqvist, et al. and Pizzorno, the sheets being joined are not resilient, but instead are deformable or capable of plastic flow. Moreover, unlike wet suit neoprene fabric which is fully cured or vulcanized, the cord strips joined by Ljungqvist, et al. and Pizzorno are unvulcanized rubber sheets (with reinforcing cords or fibers). Since the unvulcanized rubber cord strips are plastic, application of substantial pressure to the cord strips during the joining process will permanently deform the strips. Thus, in Ljungqvist, et al. grooved wheels engage the cords to urge the strips together with minimal rubber deformation. In Pizzorno the rubber sheets are urged together by wide bevelled roller elements which are skewed and have peripheral surfaces oriented parallel to the sticky top and bottom rubber sheet surfaces. Additionally, in Pizzorno a guide wing structure is provided to direct the sheets toward each other. Thus, the wide rollers engage the top, and preferably the bottom, sticky surfaces of the sheets, and urge the sheets together.

While the Ljungqvist, et al. and Pizzorno patents disclose seam forming apparatus which is suitable for moving plastic, sticky, unvulcanized, reinforced rubber cord strips together to form a butt joint, which is subsequently bonded in a separate operation by vulcanization, they do not suggest or attempt to solve the problem of forming a butt seam between resilient, compressible, flexible, vulcanized foamed fabric sheets to which adhesive must be added. The flexible and compressible nature of foamed neoprene rubber, plus the inherent need to employ an adhesive agent, makes the formation of adhesively bonded butt seams very difficult. The neoprene material must be compressed positively together proximate the edges to uniform adhesive bonding, and the entire process must be capable of semi-automation so as to be economically comparable to sewn seams such as those made by overlock-type sewing machines. In the Ljungqvist, et al. and Pizzorno patents, for example, the vulcanizing step, which is necessary for a permanent bonded seam, is not integrated in a continuous process of moving the sheets together and bonding them to form a permanent seam.

Other adhesive activation systems are known in the prior art, but they have largely been applied in lap seams with sheet stock that is not compressible. In U.S. Pat. No. 3,171,415 to Williamson, et al., for example, ultrasonic welding is used to join together the edges of cigarette paper in a lap seam. In U.S Pat. No. 3,284,257 to Soloff, et al., ultrasonic melting of thermoplastic and thermosetting materials to form a fusion joint is disclosed, and thermally activatable rubber-based adhesives are ultrasonically activated to effect bonding of nylon parts. The patent to Soloff, et al. also discloses bonding together fabrics or textiles in a lapped or accordion arrangement. In U.S. Pat. No. 3,480,492 to Hauser, nylon parts are lapped and bonded together by ultrasonic energy using a nitrocellulose adhesive or epoxy with an exothermic additive. Similarly, in U.S. Pat. No. 3,652,354 to Su, a lap seam is formed between paper sheets soaked with a metal salt complex by using ultrasonic activation, while in U.S. Pat. No. 4,747,894 to Johnston, et al., ultrasonic activation of a starch-based adhesive to form lap seams for corrugated paper board is disclosed.

The suitability of ultrasonic adhesive activation for use in bonding foamed neoprene fabric, however, has not been pursued before, perhaps because of the observed thermal sensitivity of glued neoprene. One commonly encountered problem in connection with adhesively bonded wet suits, for example, is that the bonded seams can fail when exposed to high temperatures. Surfers standing in their wet suits in front of a bonfire on a beach, for example, have reported bonded seam failures. Previous attempts to heat-weld foamed neoprene fabric sheets together have been unsuccessful since the vulcanized neoprene does not have true thermoplastic characteristics. Intense heating merely produces burning and carbonizing of the neoprene material rather than the melting associated with vinyl and other thermoplastics which are directly heat weldable.

While foamed neoprene remains as the predominant material in wet suit and dry suit construction, other vulcanized or fully cured elastomeric materials, such as HYPALON (Dupont), KRATON (Shell) and various types of foamed plastics, such as urethane, can be used. For the purpose of brevity, this application primarily will mention neoprene or foamed elastomeric sheets rather than engaging in repeated recitations of alternative materials. The invention disclosed, however, is useful in connection with these alternative materials and in certain cases, such as in the use of HYPALON, the apparatus and process of the present invention can bond either neoprene or HYPALON without modifying the apparatus which is set up for neoprene.

Accordingly, it is an object of the present invention to provide an apparatus and method for forming adhesively bonded butt seams between resiliently compressible cured, foamed elastomeric sheets which can be adapted to more conventional continuous garment forming techniques with substantial attendant cost savings.

It is another object of the present invention to provide an apparatus and method for forming adhesively bonded seams between vulcanized neoprene foam sheets which is capable of producing a seam which is very uniform and free of residual stress so as to be at least as strong as the material itself.

Another object of the present invention is to provide a method for forming an adhesively bonded butt seam between vulcanized, resiliently compressible, flexible, foamed elastomeric fabric sheets which can be accomplished in a continuous, semi-automated operation.

Still a further object of the present invention is to provide an apparatus and method for forming adhesively bonded seams between foamed neoprene sheets in which health hazards are reduced and safety is increased.

Still another object is to provide an adhesively seamed fabric member in which the seam is substantially free of residual stress and bonding is more uniform along the seam.

Still another object of the present invention is to provide an apparatus and method for forming adhesively bonded butt seams between resiliently compressible fabric sheets which produces a durable, high-strength seam, can be accomplished with relatively inexpensive equipment, requiring minimal training and maintenance, and which enables integration of a variety of adhesive activation systems with the material handling equipment.

The apparatus and process of the present invention have other objects and features of advantages which will become apparent from and/or will be set out in more detail in the accompanying drawing and following description of the Best Mode Of Carrying Out The Invention.

DISCLOSURE OF INVENTION

In one aspect of the present invention, an apparatus for forming a butt seam between opposed edges of two resiliently compressible, flexible, fully cured, foamed, elastomeric fabric pieces is provided which includes a fabric urging assembly and a transport assembly producing relative motion between the pieces to progressively urge the edges together into abutting contact along the seam. The improvement in the apparatus of the present invention is comprised, briefly, of the urging assembly, during motion of the pieces or motion of the urging assembly or both, compressing a portion of the pieces proximate and inwardly of the edges, and the urging assembly applying a lateral force in a direction toward the edges through the adjacent compressed portion of the piece to positively press the edges together while the pieces are in abutting contact.

In another aspect of the present invention, the apparatus further includes an ensonification assembly mounted proximate the fabric manipulating assembly for transmission of sufficient sonic energy to the pieces, to cause an adhesive material carried by at least one of the edges to become suitable for adhesive bonding when the edges are pressed together by the fabric manipulating assembly. In a preferred embodiment enhancement of the transfer of sonic energy to the adhesive is accomplished by applying an incremental force, hammering, the sonic energy applying head against the fabric pieces or hammering the fabric pieces against the sonic energy transducer horn. The hammering force compresses the pieces in the thickness dimension for efficient energy transfer, and it also causes lateral expansion and pressing of the opposed edges of the fabric pieces so that the force applying assembly can be used with the sonic energy generating device to form a strong adhesively bonded butt seam without a separate edge pressing or manipulation operation.

The method of forming a butt seam between opposing edges of two resiliently compressible fabric pieces of the present invention is comprised, briefly, of the steps of compressing the thickness dimension of at least one of the pieces proximate an edge thereof, and applying a lateral force to the pieces to positively press the edges into abutting contact. The present method also preferably includes the step of activating an adhesive material carried by at least one of the edges, most preferably by ensonification, to produce adhesive bonding between the edges when they are pressed together.

BRIEF DESCRIPTION OF THE DRAWING

FIG. 1 is a top perspective view of an apparatus constructed in accordance with the present invention for joining the edges of two resiliently compressible, flexible, fully cured, foamed, elastomeric fabric pieces in an adhesively bonded butt seam.

FIG. 2 is an enlarged, side elevation view, partially in cross section, of the apparatus of FIG. 1.

FIG. 3 is a rear elevation view corresponding to FIG. 2.

FIG. 4 is an enlarged, fragmentary, rear elevation view, partially in cross section, of the roller assembly of the apparatus of FIG. 1.

FIG. 5 is a fragmentary, top plan view, in cross section taken substantially along the plane of line 5—5 in FIG. 2.

FIG. 6 is a fragmentary, schematic top plan view corresponding to FIG. 5 of an alternative embodiment of seam forming apparatus of the present invention.

FIG. 7 is a side elevation view, in cross section of the apparatus of FIG. 6.

FIG. 8 is a top perspective view of an alternative embodiment of the fabric piece joining apparatus of the present invention.

FIG. 9 is a side elevation view of the apparatus of FIG. 8.

FIG. 10 is an enlarged, side elevation view, of the seaming arm of the apparatus of FIG. 8, taken substantially along the plane of line 10—10 in FIG. 8.

FIG. 11 is a top plan view of the arm of FIG. 10.

FIG. 12 is an enlarged, front elevation view of the apparatus of FIG. 8 with the front of the housing removed.

FIG. 13 is a schematic front elevation view of still another alternative embodiment of the seaming forming apparatus of the present invention.

BEST MODE OF CARRYING OUT THE INVENTION

The apparatus and method of the present invention employ a fabric manipulating assembly which is capable of, not only urging resilient, compressible, flexible fabric sheets or pieces of material together, but also is capable of firmly pressing the edges of the pieces toward each other with sufficient force to enable reliable and uniform stress-free adhesive bonding of the pieces together along a butt seam. Moreover, the fabric manipulating apparatus and method can be used with various kinds of adhesive activation assemblies to produce a continuous seam forming apparatus and method capable of forming adhesively bonded butt seams in fabrics such as foamed neoprene at a cost which is comparable to sewn seams.

Wet suits and dry suits are conventionally formed from fully cured, foamed, neoprene fabric pieces or sheets that are joined together along adhesively bonded butt seams. Lap seams would be easier to form, but they lack the comfort, aesthetics and function (stretchability) of butt seams. Moreover, formation of a butt seam between neoprene fabric sheets requires that an adhesive be applied to the edges of the neoprene pieces and that the edges be firmly and positively pressed together to uniform, reliable bonding along the seam.

Merely manipulating neoprene fabric pieces into abutting contact along opposed edges of the pieces does not pose a difficult problem. The difficulty arises in connection with attempting to firmly press the edges together to produce uniform, residual stress-free, reliable bonding. The fully cured (no longer thermoplastic) neoprene is highly flexible; it also is resiliently compressible and even stretchable. Additionally, wet suit and dry suit manufacture often requires the joining together of fabric pieces which are of differing thicknesses and which may or may not have a nylon facing sheet bonded to one or both sides of the pieces.

Accordingly, the problems associated with devising a process and apparatus for pressing together edges of flexible, resiliently compressible, thin, foamed neoprene sheets to achieve reliable, stress-free, adhesively bonded, butt seams, which are necessary for dry suits and cold-water wet suits, are substantial.

FIGS. 1 through 5 illustrate a seam forming apparatus constructed in accordance with one embodiment of the present invention, which is generally designated 21. Mounted above a support table 22 are a fabric manipulating assembly, generally designated 23, and an adhesive applying/activating assembly, generally designated 24. Manipulating assembly 23 is particularly well suited for joining together pieces of fully cured, neoprene foamed fabric of the type conventionally in wet suits and dry suits in an improved, uniform, high-strength seam.

In seam forming apparatus 21, fabric manipulating assembly 23 is formed in a manner which is capable of not only bringing resiliently compressible neoprene pieces together along a seam line, but further can firmly press the neoprene edges against each other in a continuous process to reliable adhesive bonding. In FIGS. 3 and 4, the details of construction of fabric manipulating assembly 23 can be seen. Manipulating assembly 23 includes a pair of side-by-side, spaced apart, counter-rotating roller means 26 and 27, which are in rolling engagement with resiliently compressible, flexible, fabric pieces 28 and 29. Roller means 26 and 27 preferably take the form of frusto-conical rollers having bases 31, facing and in rolling engagement with pieces 28 and 29, and peripheral frusto-conical surfaces 41 and 42 facing each other.

In order to that the resiliently compressible neoprene pieces are not only brought together, but have their edges 32 and 33 reliably adhesively bonded together, a technique must be employed which will enable edges 32 and 33 to be pressed firmly and positively towards each other. Fabric manipulating rollers 26 and 27 are mounted to compress at least one, and preferably both, of the pieces of fabric at a position or portion thereof proximate and inward of edges 32 and 33. This may be best seen in FIG. 4 in which the fabric pieces 28 and 29 are shown to be compressed by more than one-third and most preferably more than one-half their thickness dimension at positions immediately adjacent to edges 32 and 33.

It will be appreciated that in FIG. 4 bases 31 of the rollers compress the fabric pieces 28 and 29 to a maximum depth. By comparison with FIG. 5, however, it will be seen that the counter-rotating rollers 26 and 27 first engage fabric pieces 28 and 29 at about entry points 34. As the rollers counter-rotate in the direction of arrows 36 they progressively compress the fabric pieces in the thickness dimension until a maximum depth is reached, usually at about plane 37, which is the closest point between the rollers.

In the embodiment of the fabric manipulation apparatus of FIGS. 1–5, the sides 41 and 42 of rollers 26 and 27 are spaced apart. As bases 31 of the rollers compress pieces 28 and 29 in the thickness dimension, therefore, vertically extending shoulders or areas 43 and 44 facing in directions opposed to edges 32 and 33 are formed. During relative movement between the rollers and fabric pieces, peripheral roller surfaces 41 and 42 progressively apply lateral forces through areas 43 and 44 in the direction of edges 32 and 33. These opposed lateral forces also progressively increase during movement as the rollers approach plane 37 between the centers of rotation of the rollers. The lateral forces applied by peripheral surfaces 41 and 42 first move the fabric sheets or pieces together into abutting contact along seam 39, as aided by operator manipulation of the pieces, and thereafter, they firmly press edges 32 and 33 against each other to reliable adhesive bonding of the seam. As will be seen, the resiliently compressible fabric is compressed in two perpendicularly oriented directions by the rollers during motion of the fabric pieces past the rollers. The thickness compression creates a shoulder, thrust area or purchase on the fabric piece, which is then used to compress the fabric laterally and thereby press edges 32 and 33 together in a firm or positive fashion.

It should be noted that the rollers 26 and 27 also gradually exit or allow resilient expansion in both the thickness and lateral directions of the neoprene pieces downstream of centerline or plane 37, with the rollers leaving contact with the neoprene at about exit points 45. This gradual relaxation after maximum pressure at plane 37 insures that the resilient nature of the fabric pieces does not rapidly pull apart the bond achieved by pressing the edges together. Moreover, even on the downstream side of plane 37, the resilient compressibility of the fabric sheets tends to maintain a diminishing positive pressure between the edges as they decompress.

The fabric urging assembly of the present invention, therefore, takes advantage of the inherent resilient compressibility of neoprene foam to provide a mechanism for positive pressing of the opposed edges together over substantially their full height.

Using the rolling pressing action of seaming apparatus 21, seamed fabric members or sheets have been produced which are noticeably more uniform and free of residual stress in the bond produced along the seam. It is hypothesized that the progressive rolling contact and resilient compression of the fabric by rollers 26 and 27, and possibly the gradual decompression, produces a butt seam in which the opposed portions of edges 32 and 33 are joined together in a more continuous and stress-free relationship.

If a butt seam which is produced using conventional prior art pneumatic pliers and a side-by-side, discontinuous, clamping technique is stressed by pulling the fabric pieces away from the seam in opposite directions, the seam will be seen to pucker significantly along the seam. This puckering phenomenon suggests that the clamping process has resulted in non-uniform shifting or lateral discontinuities in bonding opposed edge portions during bonding. Thus, in conventional clamping processes two aligned edge portions seem to be very slightly shifted so as to result in bonding into the seam of a discontinuity or residual stress which apparently is the result of the clamping process.

In the process of the present invention the rolling contact of rollers 26 and 27 produces a seam 38 which when pulled apart does not pucker to the same degree as a conventional bonded seam. Under extreme loading there is some puckering, but under ordinary conditions very little variance in the uniformity of the bond along the length of the seam can be detected. As described below, the process of the present invention can be used to form curved seams in which one of the fabric sheets is stretched along the seam during bonding to the other fabric piece. Even when such stretching is employed, the seam rolling process of the present invention produces a relatively stress-free curved seam. There is a controlled, but relatively continuous, shifting and bonding together of edges to produce the curve, but the seam discontinuities resulting from conventional clamping processes are greatly reduced.

The importance of having a uniform stress-free or stress-reduced seam is that bonded seam failures appear to start from incipient cracking at residually stressed portions of the seam. A partially failed seam can be stressed by pulling the pieces apart and the seam failures will often be seen to occur at the stress induced puckers along the seam.

Thus, an important aspect of the present invention is the provision of an improved adhesively seamed resilient fabric sheet in which the seam is produced using a progressive rolling pressure to press opposed edges 32 and 33 of the fabric pieces together.

As may be seen in FIG. 4, it is preferable to form rollers 26 and 27 as solid, frusto-conical members having bases 31 which are relieved at 46 to provide a recess which receives the partially compressed material, for example at shoulder 47. As the rollers rotate past centerline 37, it is not desirable for the base surface 31 to pull the pieces apart. The relief or recess 46 minimizes the area of base 31 which might tend to pull the pieces away from seam line 39.

The roller means 26 and 27 also can take the form of a non-solid roller, for example, a pair of counter-rotating brush assemblies having near-vertical surfaces 41 and 42 and a lower or base set of brushes including recess or a low friction disk at base 31. While rollers 26 and 27 are preferably idler rollers, as will be described in more detail hereinafter, an additional feature of fabric manipulating assembly 23 is that it can include transport means that will move pieces 28 and 29 relative to both the pressing rollers 26 and 27 and adhesive activating assembly 24.

In the form of FIGS. 1 through 5, however, mounted opposite rollers 26 and 27 is a transport roller 51 which is mounted for rotation about horizontal axis 52 and is spaced relative to rollers 26 and 27 so as to produce compression of the compressible fabric pieces. Thus, support table 22 can be formed with an opening 53 through which roller 51 projects. The surface of transport roller 51 can be roughened or provided with a high friction material, such as rubber, to frictional engagement and driving of the fabric pieces in the direction of arrows 54 in FIGS. 2 and 5. As best may be seen in FIGS. 2 and 5, it is preferable to include a pair of transport rollers 51 and 56, which transport rollers are driven at about the same speed by drive belts 57 and 58. In the most preferred form, upstream transport roller 56 operates at a slightly lower linear peripheral velocity so that downstream transport roller 51 pulls fabric pieces slightly between rollers 56 and 51. Drive belt 58 is connected to a drive motor (not shown).

In illustrated manipulating assembly 23, frusto-conical rollers 26 and 27 are not driven rollers. Thus, rollers 26 and 27 are mounted to shafts 59 and 61, which in turn are rotatably mounted in bearing assemblies 62 and 63. Frusto-conical rollers 26 and 27, however, do not drive the fabric pieces, but are merely idlers which roll with the fabric pieces and are driven by transport rollers 51 and 56.

In order to that fabric pieces 28 and 29 are resiliently compressed, even when they are of different thicknesses, it further is preferable that the roller assemblies be resiliently biased toward the fabric pieces. Thus, the roller element bearing assemblies 62 and 63 can be movably mounted to a slide block members 71 and 71a by mounting bolts 72. Extending outwardly from vertically reciprocal slide blocks 71 and 71a are spring flanges 131 and 131a, and the upper ends of the slide blocks are guided for vertical reciprocation by a guide rail 132 (FIG. 2), which projects from and is fixedly secured to stationary spring housings 133 and 133a. Mounted in housings 133 and 133a are a pair of compression springs 74 and 74a used to independently bias each of the bearing assemblies 61 and 63 and frusto-conical rollers 26 and 27 toward the fabric pieces by pushing against spring flanges 131 and 131a. Adjustment means 76 and 76a for changing the biasing force of springs 74 and 74a also can be provided. Slide blocks 71 and 71a are secured for guided reciprocation on spring housings 133 and 133a by fasteners 78 and 78a which slidably pass through elongated vertical slots 134 and 134a.

It is also possible to provide for lateral adjustment of bearing assemblies 62 and 63. As is apparent from FIG. 3, the fabric manipulating rollers are mounted for rotation about near vertical, but converging, axes 75 and 80. Means, such as threaded adjustment member 85, can be provided for adjusting the lateral spacing between spring housings 133 and 133a. A frame member 136, formed with vertically extending slot 137, has a member 138 secured thereto by fasteners 139. The fasteners 139 can, therefore, be used to set the vertical position of both housings 133 and 133a relative to frame member 136 and table 22.

Fixed with respect to member 138 is an outwardly protruding ear 141 which receives threaded member 85 therethrough. The threads on member 85 are left and right-handed threads on either side of ear 141. As best may be seen in FIG. 2, transversely extending guide rails 142 and 143 are mounted in notches in member 138 and housings 133 and 133a. Rails 142 and 143 are fixed to member 138 and slidably received in notches 146 and 147 in housings 133 and 133a.

When the knob on adjusting screw 85 is turned, therefore, housing 133 and 133a, which have threads mating with the threads of opposite hand on member 85, are displaced toward or away from each other. This allows the spacing between side surfaces 41 and 42 of the rollers to be laterally adjusted.

It is believed that a vertical orientation of surfaces 41 and 42 at plane 37 is the most preferable. Obviously, frusto-conical surfaces 41 and 42 will be vertical at plane 37 only if the apexes of the conical surfaces and axes 75 and 80 intersect at a vertical plane between the rollers. Thus, in the preferred form, the angle of skew of axes 75 and 80 is matched to the angle of convergence of surfaces 41 and 42.

It is preferable, however, that rollers 26 and 27 be removably mounted in bearing assemblies 62 and 63. This permits, for example, the substitution of rollers with different conical angles of surfaces 41 and 42 as compared to the angles of convergence of axes 75 and 80. The result will be surfaces 41 and 42 which either converge toward the vertical or diverge away from the vertical. Similarly, adjustment means (not shown) can be provided to enable adjustment of the angles of surfaces 41 and 42.

Typically, surfaces 41 and 42 are positioned so that they barely contact each other. Engagement of the rollers with resiliently compressible foam pieces causes roller side surfaces 41 and 42 to separate by a small distance, for example, about one-half the thickness of the fabric being seamed, or less. However, the spacing between opposed roller sides also can be completely eliminated. When there is some space between roller sides 41 and 42 it is further preferable that the apparatus of the present invention include a hold-down device, such as spring blade member 90 (FIG. 2), which wipes against or presses down fabric pieces 28 and 29 immediately in advance of rollers 26 and 27. Hold-down blade resists any tendency of the fabric to climb the side walls 41 and 42 between the rollers when the rollers are spaced apart.

In the form of the invention described, the transport means or assembly is effective to frictionally engage and move the pieces passed the rollers and adhesive activation assembly. This enables the seam forming apparatus of the present invention to operate in a manner very similar to a sewing machine and permits the continuous seaming together of relatively long seams, as for example, may be found on arms and legs of garments. It would be possible, however, to have the pieces supported in a relatively stationary fashion and move the roller and adhesive activation assemblies while still employing many of the features as above described. Thus, transport rollers 51 and 56 could be eliminated and assemblies 23 and 24 mounted to a movable carriage.

It is important to note that butt seaming apparatus 21 can be used to form butt seams which are curved or arcuate. It is possible, for example, to use compression roller assembly 23 to join two fabric pieces together along a curved seam 39 by stretching or pulling on one of the pieces in a direction along the seam during the joining and bonding process. This will cause the inherent resiliency in the neoprene fabric to produce a uniform but arcuate or curved seam 39. If the amount of curvature is to be accurately controlled, the upper surfaces of the fabric materials can be marked with indicia permitting the amount of elongation to be gauged by the operator by lining up the indicia. For pieces which are relatively short and uniformly curved over their lengths, one piece can simply be elongated until it matches the other.

Since neoprene fabric is not inherently capable of being bonded together in a butt seam merely by the pressing together of edges of the fabric, seam forming apparatus 21 further includes an assembly 24 for activating and/or applying an adhesive material on at least one, and preferably both, of edges 32 and 33. Assembly 24, therefore, can be an assembly for applying adhesive to edges 32 and 33, or it can be an assembly for activating an adhesive placed on the edges in a separate operation. Assembly 24 also can be a neoprene solvent application means that will cause edges 32 and 33 to be bonded together by a solvent bonding process. Solvent bonding of neoprene foam, however, is more difficult to reliably achieve, and in the preferred form, edges 32 and 33 are coated with an adhesive by a separate process with the adhesive coating being activated by assembly 24.

During the fabrication of wet suits, as is common in the clothing industry, a plurality of sheets of neoprene are all stacked together and cut around the same template at the same time. This produces a stack of similar pieces which have their edges falling on a common, usually curvilinear, surface. While the pieces, are still clamped together after cutting, it is relatively easy to apply an adhesive material to all of the edges simultaneously by painting the same on the edges. The adhesive can then be allowed to dry and the various pieces separated from each other for joining to other complementary pieces along butt seams used to produce the aquatic garment.

Accordingly, while assembly 24 can be either adhesive activation means and adhesive application means, it is preferred in most embodiments that assembly 24 be provided as adhesive activation means mounted proximate the fabric manipulating assembly so as to activate adhesive material carried by one of edges 32 and 33 at a location producing bonding of the edges when pressed together by the compression rollers 26 and 27.

Heat has generally been regarded as detrimental to adhesively bonded neoprene seams. An important feature of the present invention, however, employs ensonification means as an energy source for thermally activating a dry adhesive previously placed on edges 32 and 33. Thus, sonic energy, preferably in the ultrasonic frequency range, or at least over 10 kilohertz, can be transmitted to pieces 28 and 29 via ultrasonic energy applying head or horn 91 having a lower end or surface 92 which contacts the fabric pieces at a position superimposed over edges 32 and 33. It has been found that by transmitting sonic energy via a transducer 91, in the frequency range above about 10 kilohertz, even dried neoprene contact cement can be virtually instantaneously activated and then bonded by compression rollers 26 and 27 in a continuous process. A frequency of 20 kilohertz provides satisfactory results and is a standard frequency in commonly available commercial ultrasonic equipment.

A neoprene adhesive which is capable of activation after it has dried by sonic energy is a neoprene contact cement manufactured by Stabond Corporation and sold under the trade name STABOND 0836 neoprene contact cement. Similar neoprene bonding cements are manufactured by Bostick and other major adhesive manufacturers. It should be noted that for best results the contact cement should be ensonified within about 48 hours after application to the edges of the neoprene sheets. With sufficient sonic energy, activation can be accomplished while advancing pieces of neoprene under horn 91 at a rate at least as high as six (6) inches per second.

As will be apparent, for best results the activation of adhesive on edges 31 and 32 should be in advance but sufficiently close to compression rollers 26 and 27 so that the adhesive is still activated when it reaches the rollers. However, there is considerable flexibility in the location of the ensonification means, and the ultrasonic transducer horn can be mounted beneath the compression rollers. The end of the horn can either extend through an opening in low friction support surface 68 or be coupled through a thin low friction support surface to transmit sonic energy to the edges of the fabric pieces and the adhesive thereon. The thickness and type of material of sheet will determine whether or not the sonic energy is directly applied to the fabric pieces or coupled through an intermediate surface.

It would also be possible to transmit sonic energy to edges 32 and 33 through a ultrasonic transducer formed as a roller, for example, transport roller 51 or transport roller 56. There are currently on the market transducers in the shape of roller elements that it is believed could be combined to both transport material and transmit sonic energy.

Other forms of adhesive activation are suitable for use with the seam forming apparatus of the present invention.

The adhesive activation apparatus can include a hot knife, which extends down between the edges and contacts the edges as they are brought together by the compression rollers. It can be provided as a conduit with a nozzle end which directs a stream of hot gases down across the edges. Moreover, a solvent applying activating assembly or an adhesive applying assembly in the form of a reservoir which contains either a solvent for activating an adhesive carried on fabric edges or a liquid adhesive itself. A perforated dispenser end can extend down between the opposed edges to be joined and wipes a solvent onto adhesive on the edges, or apply an adhesive to the edges.

The adhesive activating assembly also can be provided by a laser with fiber optic conduits that direct laser energy toward edges of the pieces. A $CO_2$ laser with appropriate infrared energy output would be suitable for use in this invention. An adhesive activating assembly in the form of an inductive transmission assembly which inductively couples to adhesive on the edges of the fabric pieces by providing iron particles or other inductively heatable material in the adhesive and/or edges, also can be employed. Finally, a radio frequency heating device may be used in which an RF emitter source can be used to activate an adhesive using frequencies from shortwave communication frequencies up through and including microwave frequencies, e.g., 1.5 Mhz to 2 Ghz.

The amount of compression required to stabilize a portion of the fabric pieces sufficiently to cause it to act in a manner similar to a substantially non-compressible member varies with the foamed neoprene being seamed. For most neoprenes compression by at least one-third of the fabric thickness will be required and by at least one-half of the thickness is preferred.

An alternative embodiment of the seam forming apparatus of the present invention is shown in FIGS. 6 and 7. Powered rollers 181 and 182 are counter-rotated and slightly spaced apart so as to permit side walls 183 and 184 to apply the primary lateral force pressing edges 186 and 187 of fabric pieces 188 and 189 together.

In order to prevent climbing of fabric pieces up between the rollers, and equally importantly, in order to effect better coupling of sonic energy from transducer 191 to the adhesive on edge 186 and 187, pressure foot means 192 is mounted in opposed relation to and biased toward ensonification means 191.

Thus, in FIGS. 6 and 7 it will be seen that support table 193 is formed with an opening 194 and the upper surface 196 of ensonification transducer 191 extends through opening 194 and is flush with the table. Pressure foot 192 may be pneumatically, hydraulically or spring biased by spring 197, which may be mounted to provide an adjustable spring force, to press the adhesive carrying edges against transducer surface 196. The downstream end 198 of pressure foot 192 preferably is shaped to mate with but be slightly spaced from seaming rollers 181 and 182 so as to maximize the length of pressurized coupling to the transducer along the seam, to resist any climbing tendency of the pieces and to help transport the fabric to the seaming rollers.

Using the butt seam forming apparatus of the present invention in which the adhesive activation means is provided by an ultrasonic transducer and seam bonding effected by seaming rollers, fabrication of wet suits and dry suits at a rate and cost which is comparable to suits having sewn seams can be achieved. Seaming apparatus 21 of FIG. 1 can be operated, for example, by foot pedals 25, so as to control the rate of advancement of the fabric pieces and by foot pedal 30, so as to control the operation of ensonifier 91, in a manner which is quite similar to a conventional sewing machine.

While the use of a pressure foot mounted in opposed relation to an ensonification transducer, as shown in FIGS. 6 and 7, enhances the transmission of sonic energy to the inactive adhesive carried by the edges of the resiliently compressible fabric pieces being joined, it has been found that applying an incremental force, in effect hammering, further enhances sonic energy coupling. Moreover, applying an incremental compressive force has the added advantage of effecting pressing of the opposed edges together while adhesive is activated to enable formation of a butt seam.

Referring now to FIGS. 8–12 a further alternative embodiment of the apparatus of the present invention can be described. A seaming apparatus, generally designated 221, for forming adhesively-bonded butt seams is shown. Seaming apparatus 221 includes an ensonification generator/transducer assembly 222 mounted proximate a fabric transport and manipulating assembly, generally designated 223 (FIG. 10). Mounted in opposed relation to ensonification device 222 is a force applying assembly, generally designated 224.

As best may be seen in FIG. 12, fabric transport and manipulating assembly 223 may include a pair of opposed frusto-conical rollers 226 and 227 which engage fabric pieces 228 and 229 proximate the opposed edges which are to be joined together in an adhesively bonded butt seam 233. As will be described in more detail below, rollers 226 and 227 both advance or transport pieces 228 and 229 through seaming apparatus 221, as well as manipulate or press together the edges of the pieces to enhance high strength bonding. Pressing together of the opposed seam edges by roller 226 and 227, however, is not required in the broadest aspect of the embodiment of FIGS. 8–12.

Referring now to FIG. 10, sonic energy generating device 222 is analogous to previously described sonic energy assemblies, and it preferably includes a sonic energy applying head or horn 230 which has a smooth and substantially planar end surface 234. End 234 slidably engages fabric or neoprene pieces 228 and 229 as transport assembly 223 moves the fabric pieces through the seaming apparatus.

In order to enhance coupling of sonic energy to relatively inactive adhesive carried by at least one of edges 231 and 232, force applying apparatus 224 of seaming apparatus 221 is formed to apply an incremental force to both of the fabric pieces by compressing them in the thickness dimension between a piece engaging surface 236 and end surface 234 of ensonification device 222.

The incremental force applied between surfaces 234 and 236 in effect hammers the resiliently compressible foam pieces against ensonification horn 230 to better couple the pieces, and edges 231, 232 carrying adhesive, for the transmission of sonic energy to the adhesive to activate the adhesive. Additionally, and very importantly, compressing the edges of the pieces between surfaces 234 and 236 causes lateral expansion of the pieces to simultaneously press edges 231 and 232 together as they are being ensonified and the adhesive is being activated. The result is that an adhesively bonded butt seam 233 is created along the length of the edges. In fact, a strong adhesively bonded butt seam 233 is formed at the ensonification and force applying station of the apparatus of FIGS. 8–12, even before the pieces are compressed together using transport and pressing rollers 226 and 227.

For example, butt seams have been produced by using rollers 226 and 227 to merely advance the pieces past ensonification apparatus 222 and force applying apparatus 224. Thus, if rollers 226 and 227 drive only one of the pieces 228, 229, for example, the rollers are on one side of seam 233 and do not span across seam 233, the resulting adhesive bond produced by the sonic energy and force-applying assemblies alone is very strong.

Accordingly, in the broadest aspect, the apparatus and method of this embodiment of the present invention do not require a separate fabric manipulating assembly 223 to press edges 231 and 232 together to form an adhesively bonded butt seam. Force applying assembly 224, therefore, can function as both an assembly for enhancement of the sonic coupling to the adhesive and as a fabric manipulating assembly which cause lateral pressing of the edges firmly together.

In the illustrated embodiment of FIGS. 8–12, surface 236 is movable toward horn end surface 234, but it also will be understood that the ensonification horn could be movably mounted (as is shown in the embodiment of FIG. 13) and surface 236 stationary, or both surfaces 234 and 236 could be displaced toward each other, to produce the incremental force required to compress the resilient fabric pieces for sonic energy transfer. The expression "incremental force" has been used because surfaces 234 and 236 may be spaced sufficiently close together that the foam pieces are slightly compressed, or have a force applied thereto, even before the hammer surface 236 is reciprocated upwardly toward horn end 234.

In the preferred form of seaming apparatus 221, force applying assembly 224 is mounted in an elongated arm 241, which in turn is cantilevered outwardly by arm 242 and downwardly by connecting housing 243 from the main body or housing 244 of the seaming assembly. The user sits facing display monitor 246 in front of vertical connecting housing 247 and reaches forward along each side of arm 241 to manually bring fabric pieces together for seaming. The relatively compact cross section of arm 241 allows seaming apparatus 221 to be used to form butt seams in arms or legs of garments such as wet suits. Thus, as shown in FIG. 9, pieces 228 and 229, here the opposite sides 228 and 229 of the same piece, can be brought together in a butt seam which closes the arm or leg as the piece is fed off the free end 248 of arm 241.

The desirability of forming garments on a cantilevered arm 241 with a free-end 248 requires that force applying assembly 224 be constructed in a manner which enables application of an incremental or hammering force out on arm 241 proximate end 248. This can be accomplished in a number of manners, but in the illustrated form, best seen in FIG. 10, piece-engaging surface 236 is provided on a movable pressure block 251 which is mounted for near vertical reciprocation in arm 241. Thus, pressure block 251 is pivotally connected at 252 to one end of an arm 253 which is pivotally mounted at 254 to the housing or framework of arm 241.

As will be seen, pressure block 251 also is wedge-shaped or formed with a tapered surface 256 which slidably engages a similarly tapered surface 257 of a wedge-shaped pusher member 258. Pusher member 258 slides on guideway 259 and is reciprocated, as indicated by arrows 261 by elongated arm 262. Horizontal reciprocation of block 258, therefore, is converted into vertical reciprocation of pressure block 251, as indicated by arrows 263, as a result of the mating tapered surfaces 256 and 257, as well as pivotal mounting of block 251 to arm 253. The length of arm 253 is sufficiently long that displacement of block 251 along arm 241 is essentially negligible.

Reciprocation of arm 262 and block 258 can be accomplished in various ways.

As illustrated, a pneumatic cylinder 301 is provided in arm 241 and has a piston 302 coupled by collar 306 to axially reciprocatable arm 262. Pistons 302 can be reciprocated by a solenoid controlled pneumatic valve assembly 303 coupled electrically at 304 to a foot pedal control of the type shown in FIG. 1 and pneumatically by conduit 307 to a source of gas under pressure. The foot pedal provides a rheostat-type control of the rate at which solenoid/valve assembly 303 operates the piston-cylinder assembly through conduits 308, which advantageously can be a double-acting piston-cylinder. Thus, as the operator pushes down on the control pedal against a biasing spring, the rate of reciprocation of piston 302, arm 262 and pressure block 251 can be increased from zero to a maximum rate. Pneumatic valve and solenoid assemblies 303 and controls for the actuation thereof are well known in the art, and various other switching and control systems can be employed.

In the preferred form of the apparatus of FIGS. 8–12, the vertical stroke length and dwell time of pressure block 251 can be varied by assembly 303 so that the pressure block can be made to dwell, or remain in its uppermost position, to apply maximum pressure to the neoprene fabric positioned between surfaces 234 and 236 for a preselected period of time.

The spacing between transducer end surface 234 and pressure surface 236, when in the down position of FIG. 10 is preferably slightly less than the thickness of the thickest of the fabric pieces to be seamed together. To enable adjustment of this spacing either transducer 230 or arm 241 can be provided with vertical adjustment means (not shown). A spacing on the order of about one millimeter less than the thickness of the thicker of pieces 228 and 229 will usually be employed. Hammer or pressure block 251 will be raised during its stroke by an amount sufficient to apply between about 30 to about 120 pounds per square inch pressure to the fabric pieces, with about 75 pounds per square inch being a good target pressure. Compression of pieces 228 and 229 by one-half or more of their thickness will usually produce sufficient pressure. A typical cycle time per stroke will be about one second, although between about 0.5 seconds to about 2 seconds can be used, and cycles as long as 10 seconds are possible. Block 251 will dwell, or be at a near top dead center, for a duration of about one-quarter to one-half the cycle time. It will be understood, that increasing or decreasing the dwell and/or increasing or slowing the cycle time still will produce adhesive bonding, particularly if the sonic energy output is correspondingly varied (increased for faster cycles or decreased for slower cycles).

Transport assembly 223 can be driven by a stepping motor which is operated in coordination with pressure applying assembly 224. Thus, transport assembly 223 also can dwell or stop advancing during the dwell time of pressure block 251 at the top of its stroke. It has been found, however, that acceptable results and a high strength bonded seam can be achieved if rollers 226 and 227 of transport assembly 223 are continuously operated. It is believed that the dwell time at the top of the stroke of pressure block 251 is sufficiently short, the fabric is sufficiently longitudinally elastic, and the rollers will slip by an amount, which together accommodate the short duration of dwell at the force-applying assembly. Moreover, it is preferable that surfaces 234 and 236 be coated with or formed of a low coefficient of friction material, such as TEFLON. Thus, there also is some ability of the fabric to slip longitudinally along arm 241 even in a compressed state.

The spacing of rollers 226 and 227 over arm 241 also preferably can be adjusted by an adjustment assembly, not shown. Usually, this is done by feel. Thus, a piece of fabric can be placed between rollers 226 and 227 and arm 241 and the spacing varied until the rollers pull the fabric enough so that, if the operator holds onto the fabric, it stretches and then begins to slip. This allows the operator to elongate the pieces as needed during seaming. Obviously, the spacing of rollers 226, 227 relative to arm 241 must be small enough to pull the pieces through the slight interference fit between surfaces 234, 236 at the ensonification/hammer assembly.

A more precise approach, however, may well be to use stepping motors which are coordinated to stop transport or advancement of the fabric pieces during dwell of pressure block or hammer 251.

Referring now to FIG. 12 further details of transport assembly 223 can be described. Mounted in apparatus housing 271 are a pair of motors 272 and 273, which as above noted can be stepping motors, but also can be continuously operating motors. Motors 272 and 273 are coupled through drive assemblies to drive rollers 226 and 227. It would be possible, of course, to use a single drive motor to drive both rollers 226 and 227. Motor 272 is carried by frame member 274 and has a series of LOVEJOY couplings and shaft portions, generally designated 276, which transmit rotation to main bearing block 277. Roller 227 is journalled for rotation in block 277 and driven therethrough by motor 272.

Transmission of driving forces from motor 273 to roller 226 is accomplished by mounting motor 273 to framework 278 and coupling the motor output shaft through a LOVEJOY coupling 279 to a drive sprocket 281. Mounted on drive sprocket 281 is an endless roller chain 282, which also is mounted on a driven sprocket 283. The driven sprocket is carried by main bearing block 277 and drives a shaft on which roller 226 is carried. Both motors are electrically connected by conductors 284 to a motor controller 286, which also is coupled at 287 for coordinated control of the motor for force applying assembly 224.

As will be appreciated, since pressure block 251 and transducer horn end surface 234 are of finite length, the rate of advancement of the fabric pieces should be selected so that rollers 226 and 227 do not advance pieces 228 and 229 by an amount which is significantly greater than the distance along seam 233 of the shorter of surfaces 234 and 236 along the seam. Preferably, the amount of advancement of the pieces between hammer blows or pressure block cycles is somewhat less than the length of the shortest of surfaces 234 and 236.

In order to provide visual feedback to the operator of seaming apparatus 221, and to provide a record of the seaming process, it is preferable that a transducer be provided which is coupled to a display apparatus 246. The seamer operator periodically can visually check the displayed sensed operating data 294 to be certain that they are substantially uniform and at or near a predetermined target levels. Moreover, a permanent record of the seaming operation can be recorded for quality control records.

In the preferred form, an infrared or optical transducer 291 is provided to sense the temperature of seam 233 as a function of displacement of the pieces as the seam exits from rollers 226 and 227. Infrared transducer 291 is coupled by conductors 292 to display 246. A temperature vs. distance curve 294 is displayed on monitor 246, but a temperature vs. time display also could be used. Similarly, pressure vs. time or distance displays could be provided by adding a pressure transducer. It has been found that a target temperature range for seam 233, which indicates that adhesive activation has occurred and a strong seam has been formed, is between about 100° F. and about 150° F.

In the embodiment of FIGS. 8–12 the preferred ensonification device 222 can be provided by a sonic energy generator operating at about 40 kilohertz with 500 watts power, although many other generators would be suitable.

Having described the apparatus of FIGS. 8–12, the seaming process of this embodiment of the present invention also may be set forth. Seaming apparatus 221 preferably is mounted on a table or support surface 296 so that an operator can set in front of the same facing monitor 246. The operator reaches around each side of vertical housing member 243 and positions opposed edges 231 and 232 of a single fabric piece or of two fabric pieces, together on the top of arm 241. Pieces 228 and 229 are placed in edge-to-edge abutting contact with end 297 (FIG. 11) positioned between horn end 234 and pressure surface 236. At least one of edges 231 and 232, and preferably both edges, carries an inactive adhesive thereon.

Ensonification device 222 and force applying assembly 224 are simultaneously turned "on" to apply sonic energy and a hammering force to edges 231 and 232. During the application of sonic energy, force applying assembly 224 compresses the fabric pieces adjacent their edges between the sonic energy horn end 234 and a pressure surface 236 as hammer block 251 is rapidly upwardly reciprocated toward horn surface 234.

After the first hammer stroke, the operator advances the pieces manually by a distance of about the length of surfaces 234/236, at which point transport assembly 223 engages the pieces and a second hammer blow is applied to the edges longitudinally abutting the section receiving the first hammer blow. The fabric pieces are then automatically advanced by rollers 226 and 227 which also firmly press the edges together to that a strong adhesive bond between the edges is achieved. Seaming apparatus 221 proceeds to continuously pull the fabric pieces past the opposed sonic transducer and incremental force applying assembly in a manner analogous to a sewing machine, and the operator may control the rate of advancement and hammering by using a foot pedal controller of the type shown in FIG. 1.

Depending on whether or not motors 272 and 273 are stepping motors, fabric pieces 228 and 229 may be continuously moved or intermittently moved. During each blow of pressure block 251 against horn end 234, the fabric pieces are compressed in a thickness dimension, which effects more efficient sonic energy transfer and squeezed laterally toward each other, which enhances bonding simultaneously with activation of the adhesive.

The result is an adhesively bonded butt seam between resiliently compressible elastomeric fabric pieces which can be rapidly formed and yet has high strength and uniformity.

Turning now to FIG. 13, a hand-held seaming apparatus, generally designated 321 is schematically illustrated. Seaming apparatus 321 includes a housing 325 in which a sonic energy applying head or horn 322 is mounted and a displacement assembly 324 also is carried. Transducer or head 322 is movably mounted in a bore or guideway 326 in the housing and displacement assembly 324 is formed and coupled to reciprocate head 322 in guideway 326, as indicated by arrows 327.

In the illustrated embodiment, displacement assembly 324 includes a pneumatic cylinder 328 and piston 329, which are fluid coupled as 331 to a pneumatic valve assembly 332. Solenoid assembly 333, in turn, operates valve assembly 332. Remote of seaming device 321 is a central ultrasonic generator 335 and a source of gas under pressure 336. Seaming device 321 is fluid coupled by conduit 334 to gas source 336 and is electrically connected to ultrasonic generator 335 by conductors 337. Solenoid assembly 333 similarly is connected to a central source of electrical power 339 by conductors 338.

While foot-actuated controls could be used, as illustrated in the drawing, a biased-open switch 341 is connected to operate the solenoid assembly, while a second biased-open switch 342 controls ultrasonic energy applying head 322.

Hand-held seamer 321 operates like a pneumatic jackhammer which carries an ultrasonic head. The seamer is to be used by placing pieces of fabric 351 and 352 on a support surface 353 with opposed edges in abutting relation to form a seam 354. The end 356 of head or horn 322 is placed over and spans across seam 354 and preferably extends over a length of the seam which is significant so as to reduce the number of side-by-side sites required to be compressed along the length of the seam in order to complete bonding down the entire seam.

Housing 325 can be manually gripped with switches 341 and 342 proximate the operator's fingers. The operator may then turn the head "on" with switch 342 and actuate the cylinder to downwardly displace head 322 against the pieces. End 356 is slammed down against fabric pieces 351 and 352 across seam 354 and sonic energy is coupled to the adhesive carried by one of the abutting edges to activate the same. At the same time, the compressing action of the head forces the resiliently compressible pieces to expand laterally and thereby be firmly pressed together, forming an adhesively bonded seam.

The operator can then slide the head down the seam and trigger the pneumatic cylinder again to bond the next adjacent length of seam 254. The process is repeated until the entire length of seam 254 is bonded.

In the most preferred form, a plurality of similarly formed seaming apparatus are all coupled to the central source of gas, ultrasound and power. Thus, ultrasonic generator 335 can be multiplexed to allow time sharing of the generator by a plurality of seamers through flexible ultrasonic energy conductors 337, 337*a*, 337*b* . . . 337*n*. Similarly, gas conduits 334, 334*a*, 334*b* . . . 334*n* can (connect a plurality of the hand-held seam forming apparatus to the central source. Power is provided to the solenoids by conductors 338, 338*a*, 338*b* . . . 338*n*.

For some applications, the sewing machine-like assembly 221 of FIGS. 8–12 will be preferable, but for others the flexibility of a hand-held seamer 321 will have advantages.

What is claimed is:

1. An apparatus for forming an adhesively bonded butt seam between opposed edges of at least one piece of resiliently-compressible, fully cured, foamed, elastomeric fabric having an adhesive carried on one of said edges, said edges further each having a thickness dimension parallel to said edges, said apparatus comprising:

a sonic energy generating device including an energy applying head positioned and dimensioned to span across said edges when placed in abutting relation and formed to apply sufficient sonic energy to said adhesive carried by one of said edges to activate said adhesive; and an incremental force applying assembly including a piece-engaging member having a surface positioned and dimensioned to span across said edges and positioned on a side of said pieces opposite to and aligned with said energy applying head at a distance spaced from said energy applying head by an amount dimensioned to receive said at least one piece therebetween when said edges are positioned in abutting relationship, said force applying assembly being formed to incrementally displace at least one of said piece-engaging member and said energy applying head toward the other of said piece-engaging member and said energy applying head during the application of sonic energy to said edges to compress said at least one piece between said surface and said energy applying head in said thickness dimension at said edges by an amount sufficient to simultaneously both laterally firmly press said edges together and as a result of resilient compression in said thickness dimension to enhance sonic energy coupling with said adhesive for activation thereof adhesive bonding together of said edges.

2. The apparatus as defined in claim 1 wherein, said at least one piece has a thickness dimension at said edges of at least 1 millimeter;

said piece-engaging member is provided by a movable pressure block mounted for reciprocation between a distance about equal to said thickness dimension of said edges from said energy applying head and a distance about equal to one-half said thickness dimension of said edges from said energy applying head for compression of said at least one piece therebetween, and said force applying assembly is formed to reciprocate said pressure block.

3. The apparatus as defined in claim 1 wherein, said force applying assembly is formed to reciprocate said energy applying head toward and away from said piece-engaging member.

4. The apparatus as defined in claim 3 wherein, said force applying assembly and said energy applying head are mounted in a common manually manipulatable housing.

5. The apparatus as defined in claim 2, and a transport assembly formed to advance said at least one piece past said energy applying head.

6. The apparatus as defined in claim 5 wherein, said force applying assembly is formed to displace said pressure block to a position of maximum displacement toward said energy applying head and hold said pressure block in said position for between about one-quarter and ore-half of a time of a complete cycle of displacement of said pressure block.

7. The apparatus as defined in claim 6 wherein, said transport assembly is formed to advance said at least one piece past said energy applying head with move and dwell periods of time, and said transport assembly is further coordinated with movement of said pressure block by said force applying assembly to cause said at least one piece to dwell during periods of time substantially simultaneous to the application of maximum pressure by said force applying assembly.

8. The apparatus as defined in claim 7 wherein, said transport assembly advances said at least one piece between said dwell periods of time by an amount not greater than a distance along said seam of a shorter of the dimension of said energy applying head and said pressure block along said seam.

9. The apparatus as defined in claim 1 wherein, said force applying assembly is formed for adjustment of the time during which said incremental force is applied to compress said at least one piece.

10. The apparatus as defined in claim 5 wherein, said transport assembly is formed to advance said at least one piece continuously past said energy applying head.

11. The apparatus as defined in claim 5 wherein, said transport assembly is formed to firmly urge said edges together as it advances said at least one piece.

12. The apparatus as defined in claim 1 wherein, said sonic energy generating device is formed to apply sonic energy to said at least one piece at a frequency of above about 10 kilohertz.

13. The apparatus as defined in claim 1 wherein, said force applying assembly is formed to compress said at least one piece in a thickness dimension to urge said edges laterally together by an amount producing said bonded seam.

14. In apparatus for activating an adhesive carried by an edge of a resiliently compressible, non-thermoplastic piece of fabric having a thickness dimension comprising:

a sonic energy generating device including an energy applying head having an end formed to engage one side of an area of said piece of fabric at said edge;

an incremental force applying member having a pressure surface mounted in aligned, opposed, spaced relation to said end of said energy applying head for engagement of an opposite side of said piece of fabric; and a displacement assembly coupled and formed to rapidly incrementally displace said pressure surface to squeeze said piece of fabric in said thickness dimension against said energy applying head by at least one-half of said thickness dimension during the application of sonic energy to said piece of fabric for enhanced coupling of sonic energy with said adhesive carried by said edge for activation thereof.

15. The apparatus as defined in claim 14 wherein, said displacement assembly is formed for reciprocation of said pressure surface toward and away from said end of said energy applying head, and is further formed for adjustment of the minimum distance between said pressure surface and said end to enable adjustment of the pressure applied to said piece of fabric.

16. The apparatus as defined in claim 15 wherein, said displacement assembly is further formed for adjustment of the time at which said pressure surface is reciprocated and held at said minimum distance.

17. The apparatus as defined in claim 16 wherein, said pressure surface is provided on a movable pressure block, and said displacement assembly is formed for adjustment of the rate at which said pressure block is reciprocated.

18. The apparatus as defined in claim 14, and a transport assembly formed to advance said piece of fabric between said end of said energy applying head and said pressure surface.

19. An apparatus for forming an adhesively bonded seam between opposed edges of at least one piece of resiliently-compressible, non-thermoplastic, elastomeric wetsuit and drysuit fabric comprising:

an adhesive activation assembly formed to apply sufficient energy to an adhesive material carried by at least one of said edge in an inactive state to activate said adhesive material for bonding together of said edges, said adhesive activation assembly being further formed to apply insufficient energy to said piece to produce plastic flow of said piece; and a fabric manipulating assembly positioned on a support proximate said adhesive activation assembly and formed with at least one roller spaced from an opposed support device by a distance substantially less than a thickness dimension of each of said edges for resilient rolling compression of a portion of said piece sufficiently proximate an edge thereof to compress said edges, said roller compressing said at least one of said edges in a thickness direction parallel to said edges by a substantial amount, and said roller simultaneously applying a lateral forces to said piece proximate said portion in a direction toward said edges while said adhesive material is activated to firmly press said edges together to effect adhesive bonding of said edges.

20. In combination, a butt seaming apparatus and a foamed elastomeric fabric piece comprising:

(a) at least one resiliently-compressible, fully cured, foamed, non-thermoplastic elastomeric fabric member having two edges each having a thickness dimension and positioned at a length thereof in side-by-side abutting relation for formation of a butt seam therebetween, at least one of said edges having an adhesive carried thereon; and (b) a butt seam forming apparatus including:

(i) a sonic energy generating device including an energy applying head dimensioned for and spanning across said edges and engaging said piece on both sides of the butt seam to be formed at a portion of said length, said sonic energy generating device being formed to apply sufficient sonic energy to said adhesive carried by one of said edges to activate said adhesive; and (ii) an incremental force applying assembly having a member with a piece-engaging surface dimensioned for and spanning across said edges at said length on a side of said piece opposite to and aligned with said energy applying head, said force applying assembly being formed to incrementally displace at least one of said member and said energy applying head toward the other during application of sonic energy to said edges to apply an incremental force to said edges compressing said edges at said length in said thickness dimension by an amount sufficient to simultaneously both laterally firmly press said edges together at said length and enhance sonic energy coupling of said energy applying head with said adhesive for activation thereof and formation of a butt seam.

* * * * *

UNITED STATES PATENT AND TRADEMARK OFFICE
CERTIFICATE OF CORRECTION

PATENT NO.    : 6,375,770 B1
DATED         : April 23, 2002
INVENTOR(S)   : Meltzer et al.

It is certified that error appears in the above-identified patent and that said Letters Patent is hereby corrected as shown below:

Column 19,
Line 13, after "foamed," and before "elastomeric" insert -- non-thermoplastic --.

Signed and Sealed this

Twenty-fourth Day of September, 2002

Attest:

JAMES E. ROGAN
Attesting Officer          Director of the United States Patent and Trademark Office